US010198279B2

United States Patent
Nelaturu et al.

(10) Patent No.: US 10,198,279 B2
(45) Date of Patent: Feb. 5, 2019

(54) THREAD SYNCHRONIZATION FOR PLATFORM NEUTRALITY

(71) Applicant: Oracle International Corporation, Redwood Shores, CA (US)

(72) Inventors: Anki Nelaturu, Fremont, CA (US); William Bruce Kilgore, Tempe, AZ (US); Joshua Miers, Alpharetta, GA (US); Mark Vakoc, Evergreen, CO (US); Michael Elges, Littleton, CO (US); Michael William McGrath, San Ramon, CA (US); Venkata Guddanti, Centennial, CO (US); David Allen Schneider, Aurora, CO (US); Robert Vandette, Boxford, MA (US); Gary Adams, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 15 days.

(21) Appl. No.: 15/229,404

(22) Filed: Aug. 5, 2016

(65) Prior Publication Data
US 2017/0116056 A1    Apr. 27, 2017

Related U.S. Application Data

(60) Provisional application No. 62/244,800, filed on Oct. 22, 2015.

(51) Int. Cl.
G06F 3/00        (2006.01)
G06F 9/455       (2018.01)
(Continued)

(52) U.S. Cl.
CPC ........ *G06F 9/45504* (2013.01); *G06F 9/4484* (2018.02); *G06F 9/451* (2018.02);
(Continued)

(58) Field of Classification Search
CPC .......................... G06F 9/54; G06F 9/455333
(Continued)

(56) References Cited

U.S. PATENT DOCUMENTS

| 7,373,632 B1 * | 5/2008 | Kawaguchi ............. G06F 9/465 709/203 |
| 8,752,057 B1 * | 6/2014 | Gould ..................... G06F 9/526 718/102 |

(Continued)

OTHER PUBLICATIONS

Yi Deng, CVM—A communication virtual machine (Year: 2008).*

*Primary Examiner* — Lechi Truong
(74) *Attorney, Agent, or Firm* — Potomac Law Group, PLLC

(57) ABSTRACT

A system performs thread synchronization across layers of code that implement an application, including native code, system code, and code in a virtual machine ("VM"). The system makes a call by the native code to the system code; and sends a message by the system code to the code in the VM. The system then sends a first response by the code in the VM to the system code; and sends a second response by the system code to the native code, where each one of the native code, the system code, and the code in the VM implements wait and notify functionality for communication with other codes that implement the application.

15 Claims, 12 Drawing Sheets

(51) Int. Cl.
*G06F 9/54* (2006.01)
*G06F 9/52* (2006.01)
*G06F 9/451* (2018.01)
*G06F 9/448* (2018.01)

(52) U.S. Cl.
CPC .................. *G06F 9/52* (2013.01); *G06F 9/54* (2013.01); *G06F 9/545* (2013.01)

(58) Field of Classification Search
USPC ...................................... 719/310, 328; 718/1
See application file for complete search history.

(56) References Cited

U.S. PATENT DOCUMENTS

| | | | |
|---|---|---|---|
| 8,856,805 B2 | 10/2014 | Poore et al. | |
| 9,104,867 B1* | 8/2015 | Thioux | G06F 21/56 |
| 2010/0299682 A1* | 11/2010 | Kwon | G06F 9/52 |
| | | | 719/328 |
| 2013/0174154 A1* | 7/2013 | Poore | G06F 8/00 |
| | | | 718/1 |
| 2014/0089920 A1* | 3/2014 | Yamamoto | G06F 1/3287 |
| | | | 718/1 |
| 2014/0219287 A1* | 8/2014 | Birke | H04L 47/621 |
| | | | 370/412 |
| 2015/0268978 A1* | 9/2015 | Vu | G06F 9/50 |
| | | | 718/1 |
| 2015/0312362 A1* | 10/2015 | Zhao | H04L 67/2819 |
| | | | 709/219 |

* cited by examiner

THREAD SYNCHRONIZATION FOR PLATFORM NEUTRALITY

CROSS REFERENCE TO RELATED APPLICATIONS

This application claims priority of U.S. Provisional Patent Application Ser. No. 62/244,800, filed Oct. 22, 2015, entitled "Thread Synchronization at Various Layers of Various Programming Environments in a Single Process," the disclosure of which is hereby incorporated by reference.

FIELD

One embodiment is directed generally to application development, and in particular, to developing applications that work the same in different platforms.

BACKGROUND INFORMATION

A great deal of time an effort goes into the construction of an enterprise application. Development of such an application may involve the specification of multiple user interfaces ("UIs") and corresponding business logic that is invoked based on a user's interaction with elements of those UIs. In recent times, mobile devices such as smart phones have become so popular as to become the premier computing device that a person might be most likely to use on a daily basis.

Unfortunately, applications developed for enterprise scenarios often cannot be ported with simplicity over to a mobile device context. One of the obstacles sometimes confronting an application developer who might wish to make his enterprise application available to mobile devices is the possibility that the enterprise application might rely heavily on the JAVA programming language, while the mobile devices might not have any way of interpreting commands specified in that language. Mobile devices often do not come configured with a JAVA Virtual Machine. Consequently, application developers often are discouraged to find that they largely must start fresh when creating an application for execution on a mobile device, even in scenarios in which a substantial portion of the business logic for that application might already exist within a JAVA-based enterprise application. This issue is further exacerbated by the fact that various mobile devices may rely on various different platforms, and hence the application developer may end up having to separately create the application for each platform.

SUMMARY

One embodiment is a system that performs thread synchronization across layers of code that implement an application, including native code, system code, and code in a virtual machine ("VM"). The system makes a call by the native code to the system code; and sends a message by the system code to the code in the VM. The system then sends a first response by the code in the VM to the system code; and sends a second response by the system code to the native code, where each one of the native code, the system code, and the code in the VM implements wait and notify functionality for communication with other codes that implement the application.

DETAILED DESCRIPTION

Figure 1:
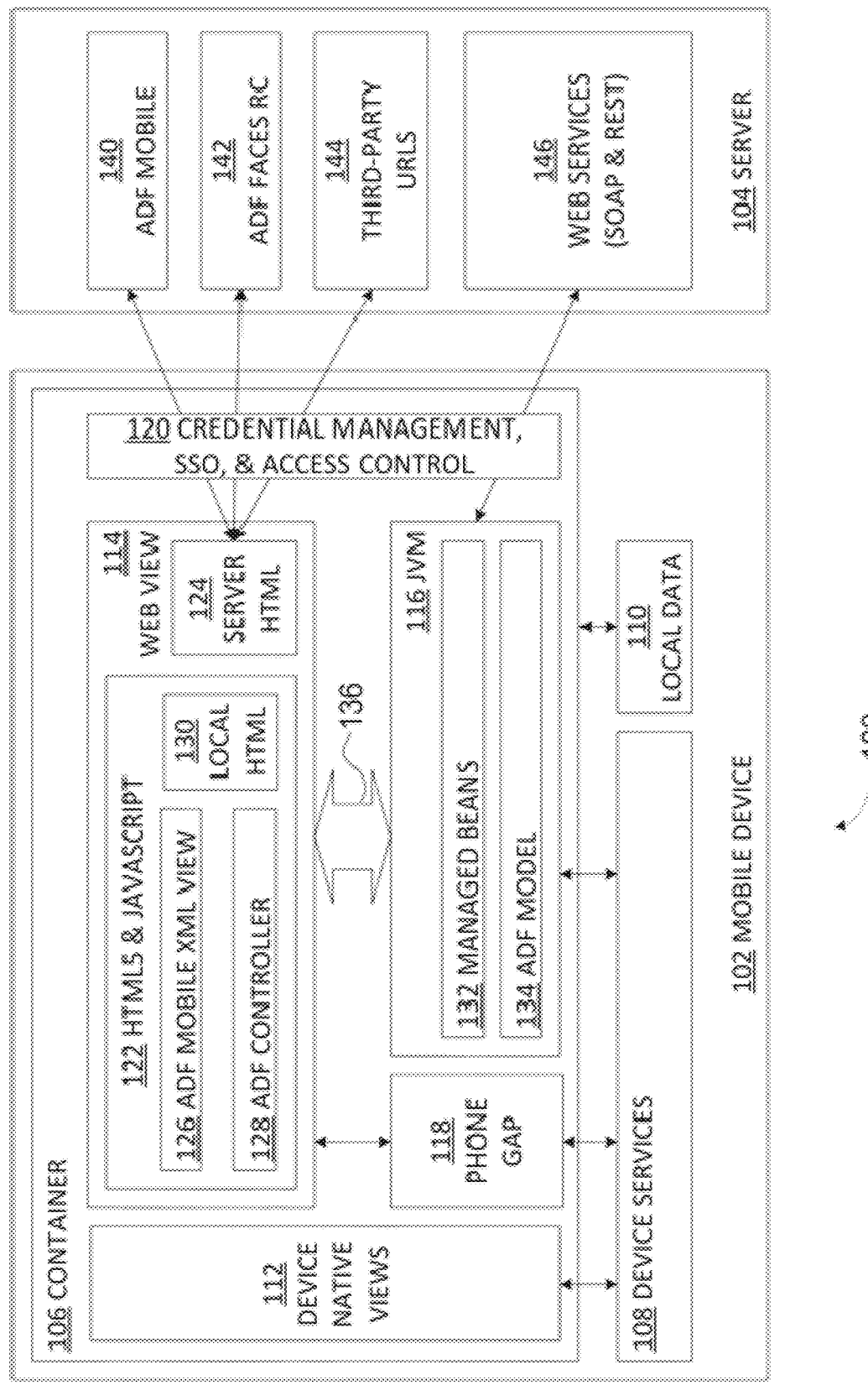
FIG. 1 is a block diagram that illustrates an example of a flexible runtime architecture, according to an embodiment of the invention.

Embodiments provide thread synchronization for applications that are platform neutral, meaning they perform the same when run on mobile devices built upon different platforms (e.g., Android, iOS, Windows, etc.). In one embodiment, by implementing thread synchronization across various layers/environments and various programming languages (e.g., native and non-native), a mobile application can support atomic operations so that the application behaves the same irrespective of the platform it is running on. Accordingly, embodiments allow for a developer to build a single application that executes the same way on various different platforms.

Virtual Channel for Embedded Process Communication

One embodiment provides an environment in which native applications can be built for mobile devices. As used herein, "native" means that the programming language used to write the source code for the application corresponds to the operating system, or platform, of the mobile device. Thus, on a mobile device having an iOS platform, a native application might be written in the Objective C programming language. On a mobile device having an Android platform, a native application might be written in the JAVA programming language. From the perspective of the user of the mobile device, a native application is downloaded by the mobile device and executes on the mobile device. In some embodiments, enterprise applications may be extended for use by mobile devices, and business logic for an application may be constructed just once and then used in both enterprise applications and mobile device applications.

Container

Embodiments may involve a "container," which is written in the native programming code corresponding to the mobile device platform. The container contains all of the components that are needed to allow native applications to interact with the mobile device's operating system. These components allow the native applications to perform all of the kinds of operations that a typical application would need to be able to perform. Such operations may include listening to events, reacting to events, controlling system resources, and displaying UIs. The container also may provide security features.

In one embodiment, an environment may be used in which native applications can be built for mobile devices. Different environments may be constructed for different mobile device platforms. For example, one environment may be constructed in the Objective C programming language, while another environment may be constructed in the JAVA programming language. Ideally, an application developer is spared from having to worry about the details of the programming language in which the environment has been constructed. Therefore, the container, which provides the environment for native applications, is generated for the application developer.

Embedded Java Virtual Machine

In one embodiment, a JAVA Virtual Machine ("JVM") is embedded within the container. The JVM may be embedded as a library, or as a slave process. The JVM allows native applications to execute business logic in the JAVA programming language. This may be the case even if the native applications are not written in the JAVA programming language. Within the container, the JVM may interpret, or otherwise exercise, the native applications' JAVA-based business logic.

Web View

In one embodiment, the native applications' UIs utilize a web view component within the container. This permits the native applications to generate UIs using Hypertext Markup Language ("HTML") 5.0. Such UIs may be viewed by a browser application executing on the mobile device. Connective components within the container connect the web view component with the embedded JVM, making the interaction between UIs and the JVM seamless. These connective components handle all of the interface-to-logic bridging on behalf of the native applications. Communication between the web view component and the JVM may be both forwards and backwards, in that information may flow from the web view component to the JVM and from the JVM to the web view component over the connective components. Such communications permit data changes to occur and to ripple through to other aspects of the native application.

Modular Elements

In one embodiment, the environment discussed above permits the construction of modular elements of a native application. Each of these modular elements is called a "feature" of the native application. Each feature may be imagined conceptually as a miniature sandbox that isolates that feature's data and operations from other features' data and operations, preventing one feature from inadvertently tainting another feature. Assuming the existence of features "A" and "B," any operations performed within feature "A" remain within feature "A," causing no interaction with feature "B," except in certain allowed instances that are at "application scope" level. Thus, an application developer can take pre-constructed features and use them as building blocks to construct a complete application. Each feature of the application is protected from each of the other features of that application, thereby providing overall security, while connectivity between components is achieved.

User Interfaces

In one embodiment, the UIs of the native applications are similar to those found in the full-fledged "Oracle Application Development Framework ("ADF")." In one embodiment, the UI is constructed by a developer in a development environment. In this environment, the developer drags and drops UI components, from a set of UI components, into the UI being constructed. These components may be dragged and dropped together in order to connect these components with each other functionally. In one embodiment, a declarative language is used to bind UI elements to underlying business logic and business objects that implement such logic. In one embodiment, an Oracle ADF mobile extensions ("AMX") layer enables this declarative-style binding. Further information regarding the Oracle ADF may be found in "Oracle ADF 11g Primer: Introduction to the Building Blocks of a Fusion Web Application" (published on the Internet in April 2007), the entire contents of which are incorporated by reference herein.

In one embodiment, a binding layer, which enables the binding of UI elements to business objects, is split into two different parts. One part of the binding layer is contained within a JAVAScript environment inside of the web view component discussed above, and another part of the binding layer is contained within a library that is embedded within the container, as discussed above. As is discussed above, in one embodiment, this library represents an embedded JVM. In one embodiment, all of the binding between UI elements and business objects is performed within this multi-part binding layer.

In one embodiment, JAVA objects are executed within slave threads as a library. A UI in a main thread may interact with these JAVA objects. The performance of the binding and interaction in the manner discussed above makes the binding and interaction seamless for the application developer.

Flexible Runtime Architecture

FIG. 1 is a block diagram that illustrates an example of a flexible runtime architecture 100, according to an embodiment. Architecture 100 includes a mobile device 102 and a server 104. Mobile device 102 includes a container 106, device services 108, and local data 110. Container 106 includes device native views 112, a web view 114, a JVM 116, and a phone gap 118. Container 106 additionally includes credential management, single sign-on ("SSO"), and access control 120. Web view 114 includes HTML5 & JAVAScript 122, and server HTML 124. HTML5 & JAVAScript 122 includes ADF mobile extensible markup language ("XML") view 126, ADF controller 128, and local HTML 130. JVM 116 includes managed beans 132 and ADF data model 134.

In one embodiment, web view 114 communicates with JVM 116 through one or more Virtual Machine Channel ("VMChannels") 136. Device services 108 are communicatively coupled with device native views 112, phone gap 118, and JVM 116. JVM 116 is also communicatively coupled with local data 110. Phone gap 118 is also communicatively coupled with HTML5 & JAVAScript 122. Phone gap 118 may be implemented via an open source project.

Server 140 includes ADF mobile 140, ADF faces rich client ("RC") 142, third-party uniform resource locators "(URLs") 144, and web services (SOAP & REST) 146. SOAP stands for Simple Object Access Protocol. REST stands for Representational State Transfer. Server components 140-144 are communicatively coupled with server HTML 124 through container component 120. Similarly, web services (SOAP & REST) 146 are communicatively coupled with JVM 116 through container component 120.

In one embodiment, container 106 is programmatic code written in the native programming language corresponding to the platform of mobile device 102. Container 106 is the shell in which native applications execute. Container 106 handles interactions with the operating system of mobile device 102. Container 106 listens for events. Essentially, container 106 constitutes the main body of a native application executing on mobile device 102. For example, a telephone application executing on mobile device 102 typically needs to be able to perform a certain set of operations in order to interact properly with the operating system of mobile device 102. Container 106 enables the application to perform such operations. In one embodiment, container 106 contains multiple sub-systems. Container 106 wraps around and connects these sub-systems together. These sub-systems may include, for example, sub-systems 112-120 illustrated in FIG. 1. Some of these sub-systems are discussed in greater detail below.

In one embodiment, device native views 112 includes views, such as UIs, that are native to mobile device 102. The presence of device native views 112 enables applications executing on mobile device 102 to access such native UIs of mobile device 102.

In one embodiment, web view 114 manages HTML 5.0 components of the application that executes on mobile device 102. Web view 114 enables such an application to access systems that may be external to mobile device 102. These external systems may be accessible through remote URLs, for example. Web view 114 manages local HTML 130 that may be used by the application. Web view 114 also manages ADF mobile XML view 126, which enables programmatic constructs of the application to be specified in a declarative manner. According to an embodiment, declarative components combine the functionality of multiple ADF components. ADF components may include, without limitation, layout components, table and tree components, list of value ("LOV") components, input components, navigation components, output components, query components, data visualization components, etc. According to an embodiment, declarative components have no business logic and are not data bound. The developer of the declarative component can hide attributes of that component so that consumers are prevented from changing those attributes.

Web view 114 also includes ADF controller 128, which, in one embodiment, manages a user interaction and application flow that the application developer defines in a task flow. A task flow, specified by the application developer, defines an application task. The definition of the task may include web pages and business logic that interacts to allow a user to complete the task. In one embodiment, ADF controller 128 enables transitions between web pages of the native application during the application's execution; ADF controller 128 processes user input, handles errors, and determines which web pages a user of the application ought to see at any given point during the application's execution.

In one embodiment, credential management, SSO, and access control 120 performs security functions on behalf of the native application. The presence of component 120 relieves the application developer from the burden of custom coding such security functions into the native application. Component 120 may provide sign-on capabilities to the native application under circumstances in which the native application attempts to access an external (to mobile device 102) resource that requires such sign-on to occur prior to granting access. Such a sign-on may be single-tenant or multi-tenant. Such a sign-on may be using the HTTPS protocol or may be non-secure. In one embodiment, all secure transactions in which the native application engages with external resources pass through component 120. Web page fetches, web service calls, and REST calls are types of operations that may be performed as a part of such a secure transaction. Component 120 provides, to the native application, protection from potentially malicious external resources.

In one embodiment, JVM 116 is implemented as an embedded JAVA library. In one embodiment, JAVA code written by an application developer is executed within JVM 116. JVM 116 is a separate thread and sub-system that executes such JAVA code within container 106.

In an embodiment, JVM 116 includes managed beans 132 and ADF model 134. In one embodiment, ADF model 134 implements data access and business logic. ADF model 134 may include a data-binding facility that connects a view layer of the application to a data and business services layer of the application. The view layer typically includes a web page having UI components. The data-binding facility may call business services that are implemented by managed beans 132. Managed beans 132 are reusable software components for JAVA. Managed beans 132 are classes that are written in the JAVA programming language and that conform to a particular convention. Managed beans 132 may be used to encapsulate many separate JAVA objects into a single object (a bean), so that those multiple JAVA objects can be passed around to different parts of the native application as a single bean object instead of as multiple individual JAVA objects.

In one embodiment, local data 110 is a database that contains data that the native application may read, update, and/or store locally on mobile device 102. Such data may be encrypted or non-encrypted. In one embodiment, container 106 provides database connectivity services that allow the native application to access local data 110 in a database-oriented manner.

In one embodiment, device services 108 includes other applications and services and features that typically come shipped with mobile device 102. Such services may include, for example, a calendar service, a telephony service, a camera service, a global positioning system ("GPS") service, etc. In one embodiment, container 106 makes device devices 108 available for use by the native application through a data control facility. If the service that the native application is using is a telephony service, then the native application may access that telephony service through phone gap 118. For purposes of discussion herein, both devices services 108 and local data 110 are considered to be external resources, even though they reside on mobile device 102, because those resources are not contained within container 106.

Resources provided by server 104 are also considered to be external resources for purposes of discussion herein, as such resources are external to container 106 as well as mobile device 102. Server 104 may be an enterprise server, for example. Mobile device 102 may access server 104 through one or more networks, typically including one or more wireless networks and the Internet. The native application executing on mobile device 102 may request a remote web page from a resource resident on server 104. Under such circumstances, component 120 of container 106 may determine which parts of the executable code specified within the remote web page are permitted to execute on mobile device 102. Component 120 may prevent certain parts of such executable code from executing on mobile device 102 if those parts are deemed to be security risks. A remote web page utilized by the native application may include resources such as ADF mobile 140, ADF faces RC 142, and third-party URLs 144. ADF mobile 140 includes a set of controls that a native application may utilize. Such controls may be shown within web view 114. ADF faces RC 142 includes, without limitation, layout components, table and tree components, list of value ("Lay") components, input components, navigation components, output components, query components, data visualization components, etc.

The native application additionally or alternatively may make SOAP or REST calls to web services 146 on server 104 in order to obtain data from server 104. Although the native application may use web services 146 as a major conduit for obtaining and storing application data, the native application additionally may cache such data locally on mobile device 102. For example, the native application may store such data within local data 110, and/or the native application may retain such data within the random access memory allocated to container 106.

Embedding a JVM, Runtime Library, and Application Code as a Slave Environment in a Native Application Techniques described herein enable a JVM, runtime library, and application code to be embedded as a slave environment within a native application. This embedding enables JAVA code to be executed as part of a native application (which might not have been written in JAVA).

In one embodiment, JVM 116, as well as a runtime library and JAVA application code, is embedded into the native application, making it possible for the native application to execute JAVA code even under circumstances in which no standalone JAVA Runtime Environment otherwise resides on mobile device 102.

Embedded JVM 116 provides a way to embed the execution of JAVA programs into the native application. This allows, for example, a UI to be presented by the native application while business logic or other code is executed within the JAVA environment. In one embodiment, the JAVA code executes independently from and asynchronously with the native portion of the application within threads that are created and managed by JVM 116. The embedding of JVM 116 within the native application makes possible the native application's use of JAVA code without requiring the native application to depend on any JAVA Runtime Environment that is external to the native application. Such a benefit is especially valuable under circumstances in which, for technical or commercial reasons, such a standalone external JAVA Runtime Environment is unavailable or prohibited. Because JVM 116 is embedded within the native application, entities external to native application do not need to have any awareness that JVM 116 exists; the native application may interact with external resources just as though JVM 116 did not exist.

According to an embodiment, actual JAVA code is embedded inside of a native application (which might not be written in JAVA) in such a way that the native code of the application and the JAVA code can interact and work with each other. This approach may be contrasted with an approach in which only the functionality of a JAVA program is implemented using native code.

In one embodiment, container 106 includes a port of the following to the native operating system of mobile device 102: CVM JVM, CDC, Foundation Profile, Security Optional Package, and JSR-169 (JDBC) runtime libraries. The JVM and the runtime libraries are packaged as native libraries which are linked with the native application. Embodiments include a native application programming interface ("API") that enables JVM 116 to be executed by the code of the native application. This API provides the ability to pass, to JVM 116, both runtime parameters and the initial JAVA class. At the time that the application developer creates the native application, portions of the runtime library may be ROMized in order to increase runtime performance and reduce startup time. The application developer can debug his JAVA code using standard JAVA tools even though the JAVA code is embedded into the native application. This capability may be available to the application developer regardless of whether the application developer is using a native debugger.

In one embodiment, container 106 includes one or more VMChannels 136. In one embodiment, in response to the first time that JAVA code needs to be used by the native application, container 106 creates JVM 116 and its sub-system based on the library that is embedded within the native application. Thus, in one embodiment, the creation of JVM 116 and its sub-system is performed in a lazy manner—put off until its performance becomes necessary. The creation of JVM 116 and its sub-system may be in response to the native application's invocation of a JAVA command, for example. Alternatively, the creation of JVM and its sub-system may be in response to the native application's reference to a JAVA binding.

In one embodiment, a JAVAScript portion of a binding detects that the binding needs to be accessed within a JAVA subsystem. In response to detecting this, the JAVAScript portion makes a reference call via phone gap 118. Container 106 intercepts the phone gap command. In response to intercepting the phone gap command, container 106 determines whether JVM 116 and its sub-system exist yet in executing form. In response to a determination that JVM 116 and its sub-system do not yet exist in executing form, container 106 creates JVM 116 and its sub-system based on the library embedded in the native application. Container 106 may perform a thread fork in order to create JVM 116 and its sub-system. In one embodiment, in addition to creating JVM 116 and its sub-system, container 106 also establishes at least one VMChannel 136. This VMChannel forms a communicative connection between container 106 and the sub-system of JVM 116. More specifically, in one embodiment, the VMChannel forms a connection between container 106 and a micro-server, called the feature context manager, within the sub-system of JVM 116. This feature context manager has control of all of the bindings and resources that are within the sub-system of JVM 116.

In one embodiment, a separate one of VMChannels 136 is additionally created for each separate feature within the sub-system of JVM 116. Each such VMChannel is a peer-to-peer communication channel between web view 114 and the particular feature (within the sub-system of JVM 116) to which that VMChannel is connected. The creation of VMChannels 136 creates pairings between parallel entities: between web view 114 and the feature to which the VMChannel is connected. Consequently, web view 114 may interact with each feature via that feature's own VMChannel using a message-passing system.

Thereafter, whenever the native application requests a property of a JAVA object that resides within the sub-system of JVM 116, the VMChannel for that JAVA object is used to retrieve that property transparently to the application developer. That property is placed, transparently to the application developer, in the memory address space of the native application for use thereby. The native application may then access the property from its own memory address space via a normal memory fetch operation.

In one embodiment, in order to increase the speed of the system, references by the native application into the sub-system of JVM 116 are avoided whenever possible. In order to help avoid such references, in one embodiment, data obtained from the sub-system of JVM 116 in the manner discussed above is cached in the memory address space of the native application outside of the sub-system of JVM 116. Cache coherency is achieved, in one embodiment, via back-channel communications that container 106 automatically conducts without requiring the awareness or involvement of the application developer.

In addition to reading properties of JAVA objects using the techniques described above, the native application can use techniques described below in order to set properties of those JAVA objects. In one embodiment, the setting of properties of these JAVA objects is achieved via a write-through cache maintained within web view 114. In response to web view 114 detecting that a value has been written to the write-through cache, web view 114 uses the appropriate one of VMChannels 136 to cause the value to be propagated to the appropriate JAVA object to whose property the written value pertains. Thus, the property of the JAVA object within the sub-system of JVM 116 is updated from the write-through cache.

In one embodiment, the sub-system of JVM 116 includes a validation mechanism that determines whether types are appropriate before permitting values to be assigned to JAVA objects. For example, in response to detecting that an attempt is being made to assign a string type value to a float type property, the validation mechanism may detect that the attempted assignment is invalid. In response to detecting that the attempted assignment is invalid, the validation mechanism prevents the assignment and throws an exception that the native application is designed to handle. Additionally, the validation mechanism causes the related write-through cache entry to reflect the value that the entry contained prior to the attempted invalid assignment. Alternatively, valid changes to JAVA object properties are propagated to web view 114, which may then refresh the native application's presentation to the user of mobile device 102 in order to reflect the change if relevant to a UI.

In one embodiment, web view 114 of native application attempts to invoke a method of a JAVA object within the sub-system of JVM 116. Web view 114 attempts to invoke this method by making a call to phone gap 118. Container 106 intercepts the phone gap command. In response to intercepting the phone gap command, container 106 places the command in the one of VMChannels 136 that is connected to the JAVA object to which the method invocation pertains. Components of the sub-system of JVM 116 then invoke the method relative to the appropriate JAVA object.

Under some circumstances, such a method invocation may pertain to a resource that resides on server 104 rather than mobile device 102. In response to detecting that the method invocation pertains to such an external resource, container 106 causes a REST web service call to be made to the appropriate one of web services 146 on server 104. Server 104 processes the request made within the call and returns a response to container 106. Container 106 responsively causes data contained within the response to be propagated to relevant JAVA objects within the sub-system of JVM 116. In a manner similar to that described above, binding updates are performed and updated values are propagated to web view 114, which may refresh the UI accordingly.

In one embodiment, whenever a REST call is made to server 104 from container 106, that call passes through component 120. Component 120 responsively determines whether security is needed for the call, and, if so, the kind of security that is needed. Component 120 may detect a type of security protocol to be used in making the REST call. If single sign-on functionality is requested for the call, then component 120 may determine whether appropriate credentials for the sign-on reside on mobile device 102. Component 120 may embed these credentials within the call prior to sending the call onward to server 104.

In one embodiment, depending on the content of the response received from web services 146, web view 114 may determine that some or all of the content ought to be stored in various repositories resident on mobile device 102. For example, in response to determining that the web service response specifies a list of contacts, web view 114 may determine that the contacts within the list should be placed within a contact list of mobile device 102; this contact list may be external to and independent of the native application. In response to such a determination, web view 114—and, more specifically, ADF controller 128, may cause a command, specifying the content, to be sent to phone gap 118. In response to receiving the command, phone gap 118 may interface with device services 108 and cause an appropriate service (e.g., the contact list service) to receive and process the content specified by the command. In the case of the contact list service, for example, this processing may involve storing contacts (previously received in a web services reply from server 104) within a contact list maintained by the contact list service within device services 108.

In one embodiment, container 106 stores data into and retrieves data from local data 110 using JAVA Database Connectivity ("JDBC") and a database driver. The communications between container 106 and local data 110 may be encrypted or non-encrypted. The native application may use local data 110 as a database to manage the native application's state data. Data within local data 110 may be used to set properties of JAVA objects within the sub-system of JVM 116. Subsequently, a user of the native application may access the properties of these JAVA objects via a user interface presented by web view 114. Again, data retrieved from local data 110 may be cached within container 106 in order to avoid more expensive transactions between container 106 and resources external to container 106.

Canonical Mechanism for Creating and Assembling Features into a Mobile Application In one embodiment, a canonical mechanism is provided to users, such as application developers, to create smaller application features. As used herein, a feature is a combination of presentation and business logic. The canonical mechanism enables these smaller features to be assembled into a single mobile application while clear separation of state is maintained. In order to prevent any individual feature from being corrupted or tampered with, in one embodiment, each feature is separately sandboxed so that its direct exposure to other features of the same mobile application is limited or eliminated completely. In one embodiment, a mobile application's presentation is separated from that mobile application's business logic by placing each of these into a separate, distinct application layer that is isolated from other application layers. Each of these layers may have separate code, data, and life-cycles. Beneficially, techniques disclosed herein enable multiple disjoint features to be blended together in an isolated manner so that more complex applications can be developed rapidly.

Techniques disclosed herein enable multiple application features, which may be considered mini-applications, to be merged together into a single application. In order to promote or restrict the visibility of feature data, various different application-scope, feature-scoped, and page flow-scoped variables are supported. Using techniques disclosed herein, developers are enabled to determine which data is being exposed to various features of a metadata-driven application.

In order to enable the assembly of multiple different application features into a single application, an embodiment utilizes a canonical mechanism. In one embodiment, this canonicalization is achieved through the use of an expression language. The expression language used may be a standard expression language, for example. In one embodiment, the expression language used is JAVA Unified Expression Language.

The JAVA Unified Expression Language provides a way to simplify expressions in JAVA server pages ("JSP"). It is a simple language used for accessing implicit objects and JAVA classes, and for manipulating collections in an elegant manner. The language provides the ability to use run-time expressions outside of JSP scripting elements. The JAVA Unified Expression Language provides a pluggable, extensible, resolver mechanism, and a way to set data and invoke methods from a web page. Additional details regarding the JAVA Unified Expression Language can be found in "The JAVA EE 5 Tutorial" (© 2010 Oracle), which is incorporated by reference herein.

In one embodiment, container 106 includes a parser and evaluator constructed in JAVAScript and a parser and evaluator constructed in JAVA. These parsers and evaluators parse and evaluate JAVA Unified Expression Language expressions that are contained in web pages that the mobile application uses. Because container 106 includes a JAVAScript parser and evaluator, it is possible that the parsing and evaluation of some expressions may be done without utilizing the JAVA engine, which can produce gains in execution speed. Once the properties of JAVA objects have been initially obtained from the sub-system of JVM 116, those properties may be cached and later accessed using JAVAScript. Conversely, in one embodiment, properties of objects that have been parsed and evaluated using the JAVAScript parser and evaluator are cached within the sub-system of JVM 116, so that, thereafter, the JAVA parser and evaluator can access the properties of these objects without reference external to the sub-system of JVM 116.

In one embodiment, each data change event occurring within container 106 causes two mirrored copies of the same data to be modified: one copy within the sub-system of JVM 116 (the JAVA layer) and one copy within web view 114 (the JAVAScript layer). Thus, in one embodiment, a change to data within web view 114 or JVM 116 is automatically pushed to the other of web view 114 and JVM 116.

According to an embodiment, isolation between features is maintained by sandboxing each object's data and that data residing in any cache. Thus, in one embodiment, each JAVA object in the sub-system of JVM 116 is prevented from accessing the data of any other JAVA object in that sub-system, and, additionally, each such JAVA object is prevented from accessing the cached data (e.g., in web view 114) of any other JAVA object. Furthermore, in one embodiment, each JAVA object in the sub-system 116 has its own one of VMChannels 136 that no other JAVA object shares. Communications between a JAVA object and that JAVA object's analogue in web view 114 are, in one embodiment, conducted exclusively through the particular VMChannel assigned to that JAVA object and its analogue in web view 114.

In one embodiment, each separate application feature is loaded with a separate JAVA class loader assigned exclusively to that application feature and no other. A system class loader loads all classes that are application-scoped. However, each feature may contain its own class loader that is a child of the system class loader. Because each feature is loaded by its own class loader, no feature is able to access the data of any other feature directly. This is the case even if two separate features are defined in the same class file.

In one embodiment, a mobile application is constructed as a set of projects. One of these projects is designated the application controller project. All objects and data placed into the application controller project are deemed to be system-wide in scope. In contrast, each feature has its own separate project. Each feature may encompass a set of multiple classes. According to an embodiment, the class loader for a particular feature is only capable of accessing the classes that are in the set of classes that are encompassed by that particular feature. A class loader for one feature is unable to locate classes encompassed by other features. However, if a class is promoted into the application controller project, then that class can be located by the class loaders of all features, because then that class has become system-wide in scope. Through such promotion to system-wide scope, data can be shared between features even in a strongly sandboxed environment.

Virtual Channel for Embedded Process Communication

In one embodiment, the VMChannel provides a way to communicate between a native mobile application and an embedded virtual machine. In one such embodiment, the basic UI aspects are performed by the native application whereas the business logic is performed by the embedded virtual machine. In order to provide this division, an ultra-fast channeling mechanism is provided that allows core channel and framework commands as well as application level messages to travel in both directions.

In one embodiment, the VMChannel provides bidirectional controlled communication. The communication is ultra-fast and priority based. Further, it provides a predictable life-cycle for both the channel and messages.

In one embodiment, the VMChannel provides a canonical mechanism for the presentation and business logic tiers to communicate within a single mobile application even though they are in completely discrete environments and memory spaces. The VMChannel is useful for interactions with an embedded virtual machine.

An embodiment of a VMChannel is incorporated into the ADF Mobile Framework product from Oracle Corp.

In one embodiment, a VMChannel provides a messaging framework that enables communication flow between a native entity and a JAVA entity. The messaging framework enables a JAVA entity (e.g., JAVA code) to be able to send a message to a native entity (i.e., an entity implemented using native code), have the native entity do processing corresponding to the message, enable the native entity to send a response back to the JAVA entity corresponding to the message received from the JAVA entity, and for the JAVA entity to receive the response. In the other direction, a native entity may use a VMChannel to send a message to a JAVA entity and receive a response message from the JAVA entity via the VMChannel.

At a conceptual level, a VMChannel provides a communication channel between two end points. One of the end points can be a JAVA entity and the other can be a native entity. In one embodiment, the VMChannel provides a communication channel between JAVA messaging system and ADF messaging.

A mobile application is an application that is written for execution on a mobile device such as an iPhone, Blackberry, Android phone, etc. A native application for a device is an application that is specifically designed to run on that device's operating system and machine firmware. Typically, a native application written for a particular device has to be modified or adapted before it can run on a different device with a different operating system and/or device firmware. For example, a mobile native application written for an iPhone is designed to run on Apple's iOS operating system. As another example, a mobile native application designed for an Android phone is designed to run on the Android operating system. Examples of languages that may be used to code native applications include Objective C for the iPad/iPhone platform, Android JAVA for the Android platform, C# for the Microsoft mobile device platform, and others. It is to be understood that the type or nature of the native platform or the native language is not intended to limit the scope of embodiments of the present invention. A VMChannel may be used with various different platforms and native applications.

In one embodiment, a VMChannel enables asynchronous, symmetric, bi-directional messaging between two end points. In one embodiment, multiple VMChannels may be opened concurrently, each with its own life cycle. The multiple VMChannels are managed in a centralized manner. In one embodiment, a VMChannel allows for variable-sized messaging. In one embodiment, a VMChannel enables correlations to be specified between messages. The correlations may be used, for example, to implement a request-response messaging paradigm. In one embodiment, messages communicated using VMChannels may be prioritized.

As indicated above, a VMChannel enables communications between a JAVA entity (e.g., a JVM) and a native entity. The two entities may be executing on a mobile device. In one embodiment, the JAVA entity and native entity execute in the same process space. In alternative embodiments, the JAVA entity and the native entity may execute in different processes. The VMChannel architecture does not require the JAVA entity and the native entity to be in the same process space. The two entities do not even have to be on the same backplane.

In one embodiment, for a JAVA entity in communication with a native entity using a VMChannel, the JAVA entity may be used as a mini runtime engine within a native application comprising the native entity. The master of the application is the native code. The JAVA entity is a slave virtual machine that runs solely inside the native code application. In another embodiment, the JAVA entity may be a sibling of the native code.

Figure 2:
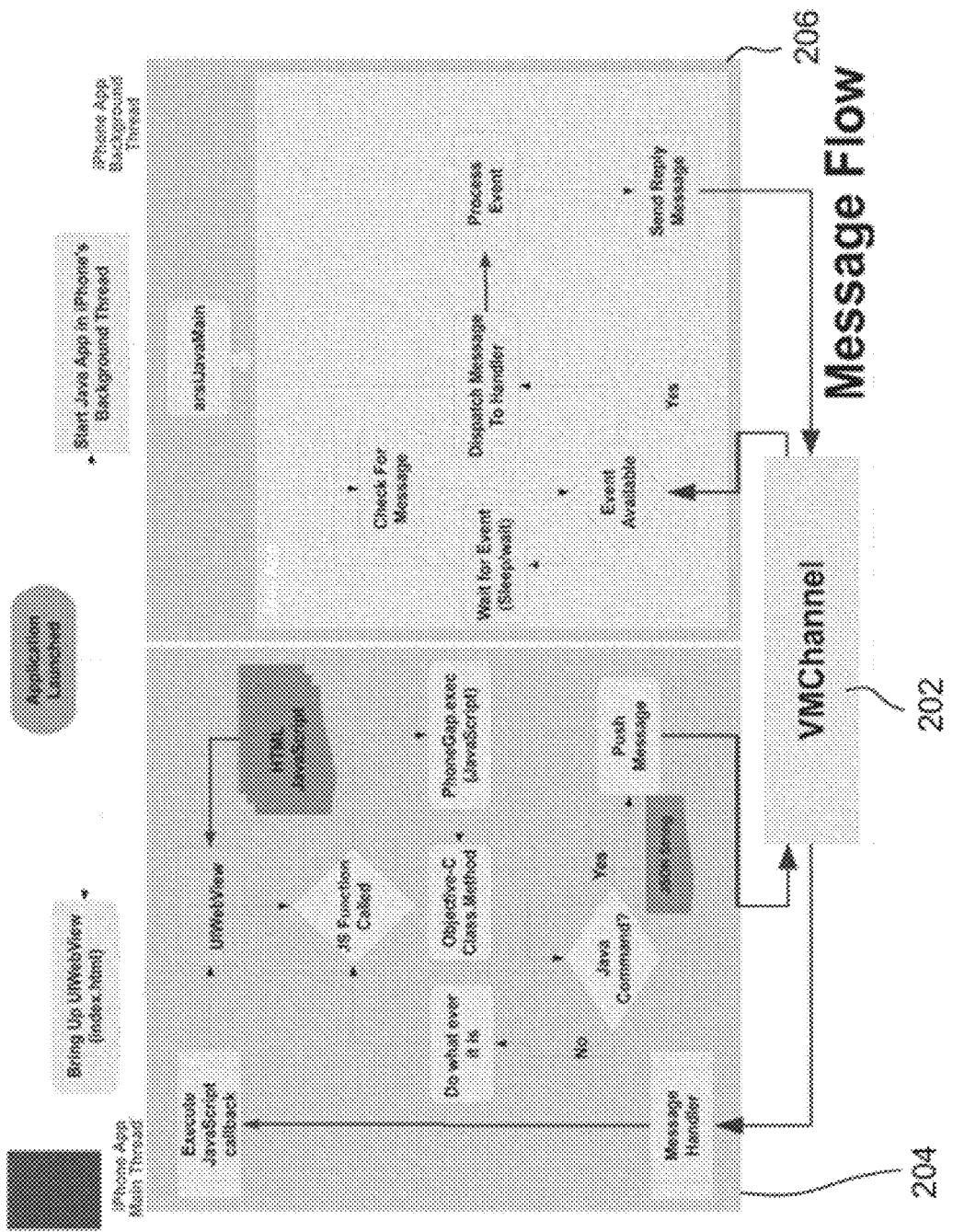
FIG. 2 depicts an example of how a VMChannel may facilitate flow of messages between a native entity and a JAVA entity according to an embodiment of the invention.

FIG. 2 depicts an example of how a VMChannel may facilitate flow of messages between a native entity and a JAVA entity according to an embodiment. As shown in FIG. 2, a VMChannel 202 facilitates communications between a native entity 204 and a JAVA entity 206. In this example, the native entity and JAVA entity are part of the same native application. The application bundle may comprise an Objective C executable (*.exe) and JAVA lib compiled in. JAVA class files are treated as resources that run within the JDM lib. VMChannel 202 enables messages to be passed from native entity 204 to JAVA entity 206 and from JAVA entity 206 to native entity 204.

An application developer does not have to know of the VMChannel. The application developer can develop native code just the same as before, for example, using a native coding tool. The application developer may develop JAVA code using a tool such as JDev (JDeveloper). In one embodiment, when the application is built, the JAVA code is compiled into a bunch of *.jar files. The *.jars are then embedded into the native application, for example, as a property file, or as an image. When CVM is started, the Jar files are loaded as data and are executed within the CVM.

Referring again to FIG. 1, a JAVA entity (shown as JVM 116) is embedded as a library within the native application represented by container 106. VMChannels 136 are shown as an arrow between JVM 116 and the native code component. Both the native entity and the JAVA entity have their own separate address spaces within the address space of container 106. VMChannels 136 provide a communication channel to enable communications between the two. VMChannels 136 allows messages to be communicated between the two environments (i.e., native and JAVA) using a messaging protocol.

One or multiple VMChannels may exist concurrently, each running to different features/contacts. Each VMChannel provides security aspects such that a message cannot cross a boundary from one channel to another. A VMChannel provides a point-to-point channel between two end point entities. A message sent on one VMChannel is not allowed to cross over to another VMChannel (i.e., no cross pollination). In one embodiment, the end points of a VMChannel are within the same application space but in their own separate addresses spaces. The two end points do not need to have the same process id. As the two entity end points are running in their own separate address spaces, the VMChannel enables communication between the two.

Multiple native entities can communicate with a single JAVA entity using VMChannels. Likewise, a single JAVA entity can communicate with multiple native entities using VMChannels. One or more VMChannels may be created and used for messaging between two entities.

In one embodiment, a VMChannel uses a networking style layered protocol for communication of messages. A message communicated via a VMChannel comprises a header and a body. The body stores the message content or payload. The header comprises information that is used for communicating the message via a VMChannel. In one embodiment, the header comprises information such as identification of a request, correlation information (e.g., a correlation id) that can be used for correlating a response message to a request message, priority information indicative of the priority for the message (e.g., higher priority messages are given preference over lower priority messages), quality of service information, and other information. In one embodiment, the header may comprise multiple headers corresponding to the different layers.

A VMChannel is responsible for marshaling and shoveling messages between two end points, where one end point can be in a JAVA environment while the other is in the native code. A VMChannel itself is message content agnostic, i.e., the VMChannel does not know/care about the actual contents of the body/payload of the message being communicated. Further, the size of messages communicated via a VMChannel does not need to be fixed. For example, one message could be 1 byte, another several bytes, and the like.

VMChannels are bi-directional, i.e., when using a VMChannel between a native entity and a JAVA entity, messages can be sent from the native entity to the JAVA entity and from the JAVA entity to the native entity using the same VMChannel. In a request-response scenario, a request can be initiated from the JAVA side or from the native side, and likewise a response can be sent from the JAVA side or from the native side.

Multiple messages may be pumped into a VMChannel from either end point. In one embodiment, a "supply-consumer" model may be used for the messaging, wherein a supplier entity can send multiple messages into the VMChannel, and the consumer entity can pick up a message at a time, process it, and then pick the next message, and so on. A VMChannel thus enables a symmetric, bidirectional, asynchronous messaging protocol.

Priorities may be assigned to messages such that higher priority messages within a VMChannel are handled before lower priority messages. In one embodiment, a VMChannel uses a priority-based queue to facilitate priority messaging.

In one embodiment, a VMChannel uses handlers on the native entity side and on the JAVA entity side. A message received by the VMChannel is provided to the handler at the receiving side for further processing of the message. In one embodiment, a handler is responsible for correlating responses to requests.

Figure 3:
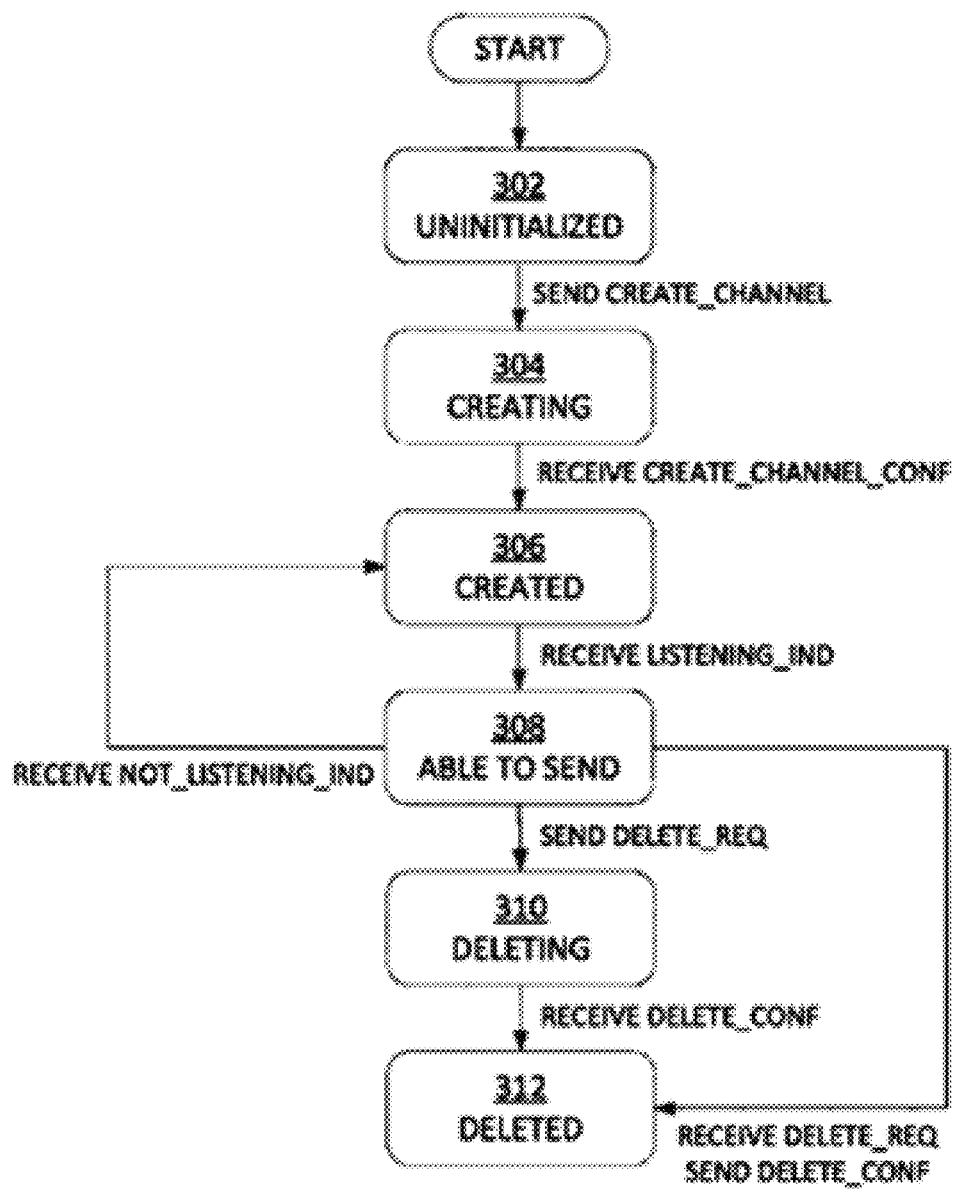
FIG. 3 depicts a state diagram for a VMChannel according to an embodiment of the invention.

FIG. 3 depicts a state diagram for a VMChannel according to an embodiment. The VMChannel begins in state uninitialized 302. In response to the sending of a CREATE_CHANNEL message, the VMChannel transitions to state creating 304. In response to the receiving of a CREATE_CHANNEL_CONF message, the VMChannel transitions to state created 306. In response to the receiving of a LISTENING_IND message, the VMChannel transitions to state able to send 308. From state 308, if a NOT_LISTENING_IND message is received, then the VMChannel transitions back to state created 306. Alternatively, from state 308, if a DELETE_REQ message is received, then the VMChannel transitions to state deleting 310. Alternatively, from state 308, in response to the receiving of a DELETE_REQ message and the sending of a DELETE_CONF message, the VMChannel transitions to state deleted 312. From state 310, in response to the receiving of a DELETE_CONF message, the VMChannel transitions to state deleted 312.

Figure 4A:
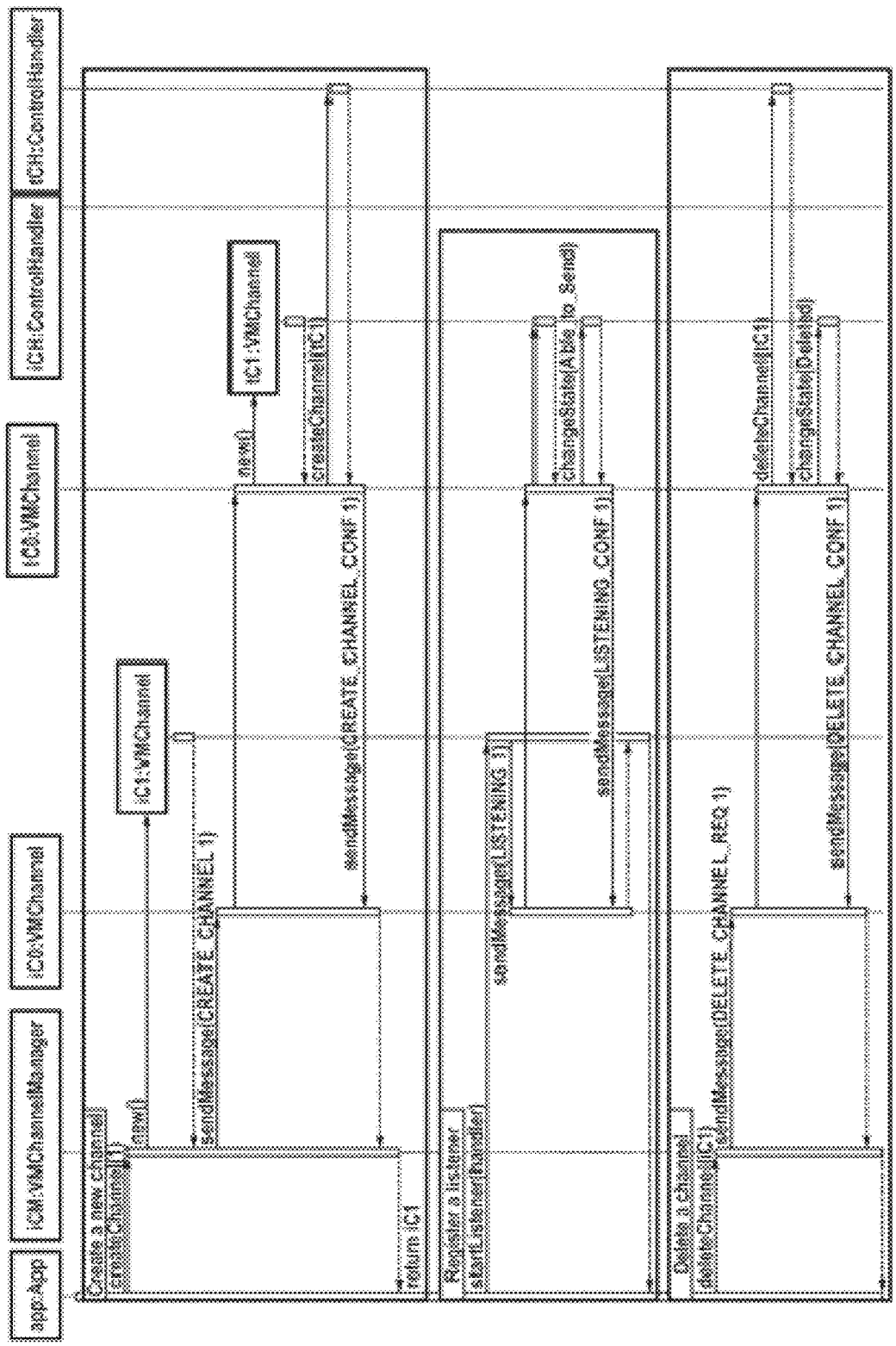
FIGS. 4A and 4B depict control message sequence diagrams for creating a VMChannel, registering a listener for a VMChannel, and deleting a VMChannel according to an embodiment of the invention.
Figure 4B:
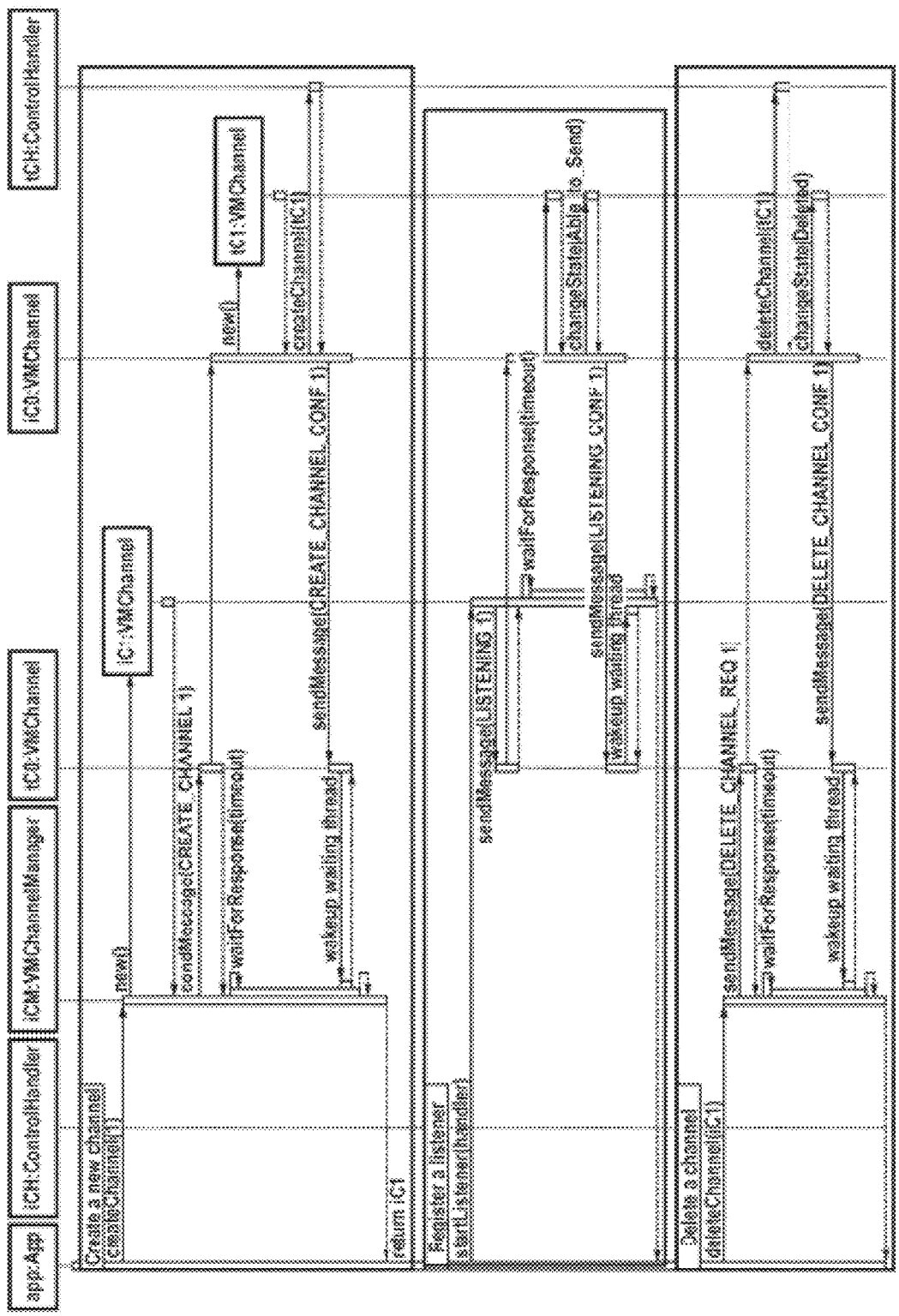

FIGS. 4A and 4B depict control message sequence diagrams for creating a VMChannel, registering a listener for a VMChannel, and deleting a VMChannel according to an embodiment. For example, in FIG. 4A, a message is shuttled across from the native side to JAVA side. Once a message is in the VMChannel, a channel manager on the receiving side (e.g., on the JAVA side) detects the presence of the message in the VMChannel, retrieves the message from the VMChannel, and hands it to an appropriate handler for further processing. The message may then get processed and a response may be sent back. The response message is pushed into the VMChannel from the JAVA side and communicated over to the native side via the VMChannel. The channel manager on the native side then detects presence of the message, gets the message from the VMChannel, and hands it to a handler on the native side for further processing. In one embodiment, a handler may perform the correlation and may call an appropriate response handler.

There are various ways in which correlation between messages may be performed. For example, in one embodiment, correlations are done using a correlation/association ID. In one embodiment, when a request message is sent by a sender to a VMChannel, information is maintained on the sender side about the pending request. When a response message is received by the sender via the same VMChannel, a lookup is performed in the pending requests information to determine a corresponding request for the response. If such a request is found then the response is correlated to the request and the request may be removed from the pending requests information. An appropriate callback may be called based upon the success or failure of the response. If no pending request is found for the response, then an error condition may be indicated and error recovery processing initiated.

In one embodiment, there is a control channel, which is considered the master. Requestors (e.g., native entities or JAVA entities) may send requests for creation of additional VMChannels between two end points. The control channel then creates the requested VMChannel. A negotiation may take place between the two endpoints for the VMChannel to be created before the VMChannel is established. In one embodiment, multiple levels of negotiations may take place, for example, one at the application layer (ADF layer—correct routing, sandboxing, correlation), one at the protocol layer (VMChannel layer—ensure robust secure stable environment for messages). Various header portions may be used for the multilayered approach. Handlers are then associated with each side of the created VMChannel. On the native side, the one or more handlers may be written in a native language (e.g., objective C). On the JAVA side the one or more handlers are written in JAVA. A handler may be configured to perform various functions including but restricted to doing correlations, checking error conditions (e.g., check for whether it is an unsolicited response, invalid response), security and routing functions, and the like.

In one embodiment, a VMChannel ensures that no messages received by the VMChannel are dropped. The VMChannel ensures that a message is properly handled by someone listening on the receiving side. The VMChannel also handles time outs, determines when to abandon, perform breakdown of the VMChannel, etc.

Figure 5:
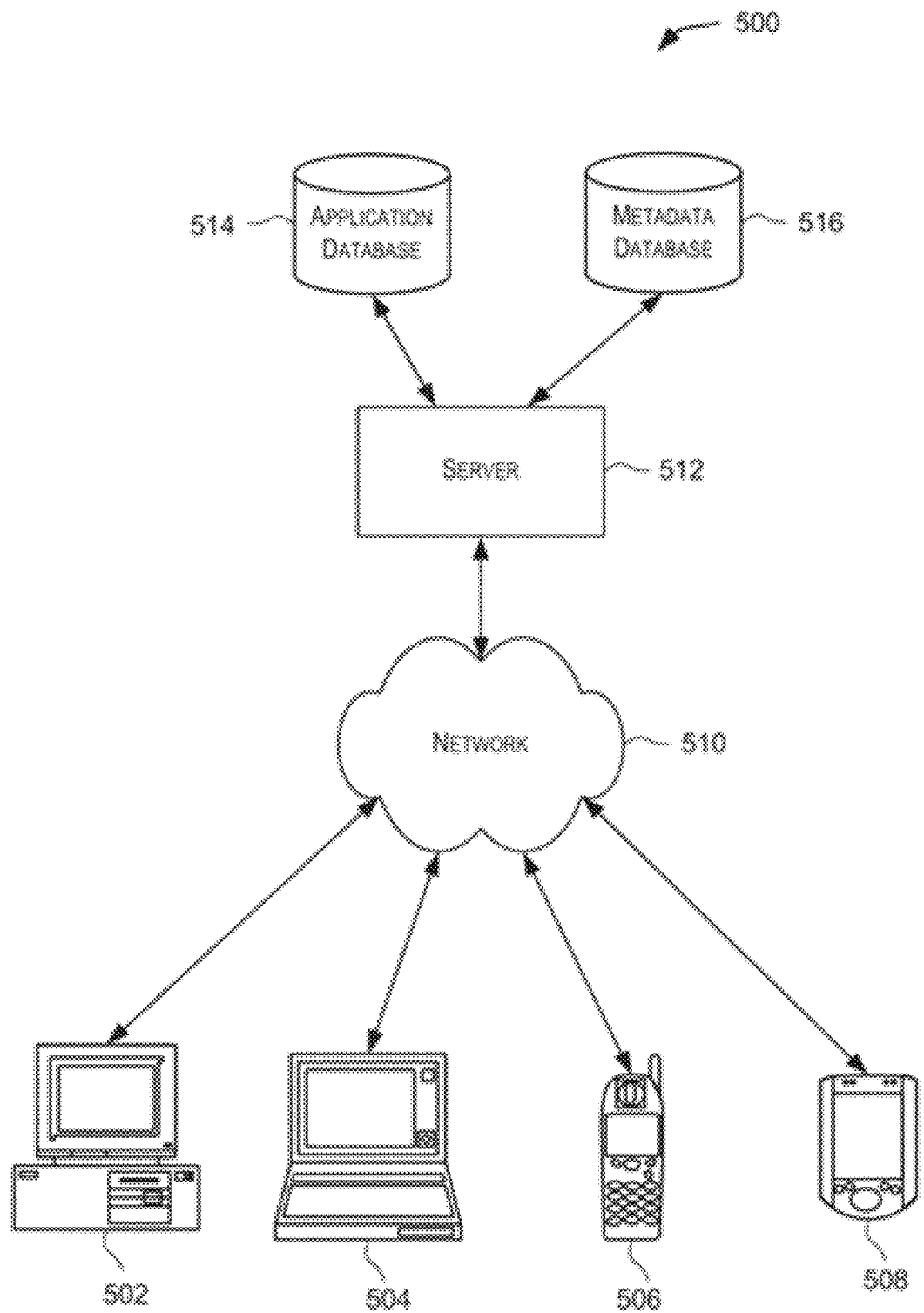
FIG. 5 is a simplified block diagram illustrating components of a system environment that may be used in accordance with an embodiment of the present invention.

VMChannels provide several features that were not previously available, especially on a mobile device. A VMChannel provides an asynchronous communication mechanism that is not bounded by size or directionality while providing quick access in a limited/small footprint such as on a mobile device. It offers flexibility coupled with priority. It provides a controlled environment for communication between two entities, which may be embedded or externalized, irrespective of who is the sender or receiver Hardware Overview FIG. 5 is a simplified block diagram illustrating components of a system environment 100 that may be used in accordance with an embodiment. As shown, system environment 500 includes one or more client computing devices 502, 504, 506, 508, which are configured to operate client applications including native client applications and possibly other applications such as a web browser, or the like. In various embodiments, client computing devices 502, 504, 506, and 508 may interact with a server 512.

Client computing devices 502, 504, 506, 508 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 502, 504, 506, and 508 may be any other electronic device, such as a thin-client computer, Internet-enabled gaming system, and/or personal messaging device, capable of communicating over a network (e.g., network 510 described below). Although exemplary system environment 500 is shown with four client computing devices, any number of client computing devices may be supported. Other devices such as devices with sensors, etc. may interact with server 512.

System environment 500 may include a network 510. Network 510 may be any type of network familiar to those skilled in the art that can support data communications using any of a variety of commercially-available protocols, including without limitation TCP/IP, SNA, IPX, AppleTalk, and the like. Merely by way of example, network 510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 512 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 512 may be adapted to run one or more services or software applications.

Server 512 may run an operating system including any of those discussed above, as well as any commercially available server operating system. Server 512 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 500 may also include one or more databases 514, 516. Databases 514, 516 may reside in a variety of locations. By way of example, one or more of databases 514, 516 may reside on a non-transitory storage medium local to (and/or resident in) server 512. Alternatively, databases 514, 516 may be remote from server 512, and in communication with server 512 via a network-based or dedicated connection. In one set of embodiments, databases 514, 516 may reside in a storage-area network (SAN) familiar to those skilled in the art. Similarly, any necessary files for performing the functions attributed to server 512 may be stored locally on server 512 and/or remotely, as appropriate. In one set of embodiments, databases 514, 516 may include relational databases, such as databases provided by Oracle, that are adapted to store, update, and retrieve data in response to SQL-formatted commands.

Figure 6:
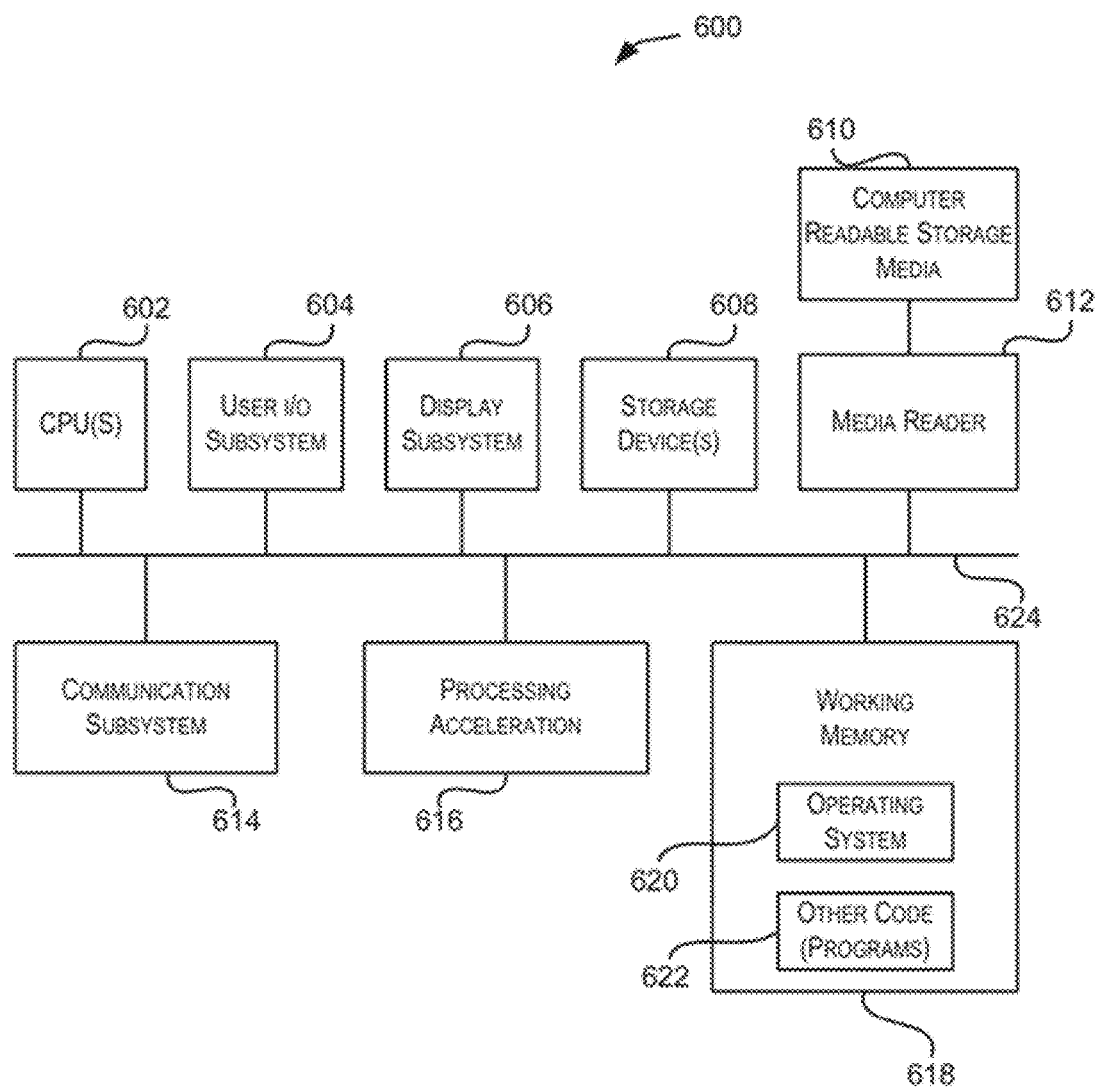
FIG. 6 is a simplified block diagram of a computer system that may be used in accordance with embodiments of the present invention.

FIG. 6 is a simplified block diagram of a computer system 600 that may be used in accordance with embodiments. For example server 512 or clients 502, 504, 506, or 508 may be implemented using a system such as system 600. Computer system 600 is shown comprising hardware elements that may be electrically coupled via a bus 624. The hardware elements may include one or more central processing units ("CPUs") 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as disk drives, optical storage devices, and solid-state storage devices such as a random access memory ("RAM") and/or a read-only memory ("ROM"), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor ("DSP"), a special-purpose processor, and/or the like.

Computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 may permit data to be exchanged with network 510 and/or any other computer described above with respect to system environment 500.

Computer system 600 may also comprise software elements, shown as being currently located within working memory 618, including an operating system 620 and/or other code 622, such as an application program (which may be a client application, Web browser, mid-tier application, RDBMS, etc.). In an exemplary embodiment, working memory 618 may include executable code and associated data structures used for relying party and open authorization-related processing as described above. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Mobile Applications in MAF

In some embodiments, an application may be deployed under a mobile application framework ("MAF") that provides built in security to control access to the application and ensure encryption of sensitive data, such as Oracle MAF from Oracle Corp. MAF is a hybrid mobile architecture that uses HTML5 and Cascading Style Sheets ("CSS") (to render the UI in the web view), Java (for the application business logic), and Apache Cordova (to access device features such as GPS activities and e-mail). Because MAF uses these cross-platform technologies, the same application can be built for both Android and iOS devices without having to use any platform-specific tools. After an application is deployed to a device, it behaves as applications created using such platform-specific tools as Objective C or the Android SDK. Further, MAF allows for building the same application for smartphones or for tablets, thereby allowing reuse of business logic in the same application and target various types of devices, screen sizes, and capabilities.

Figure 7:
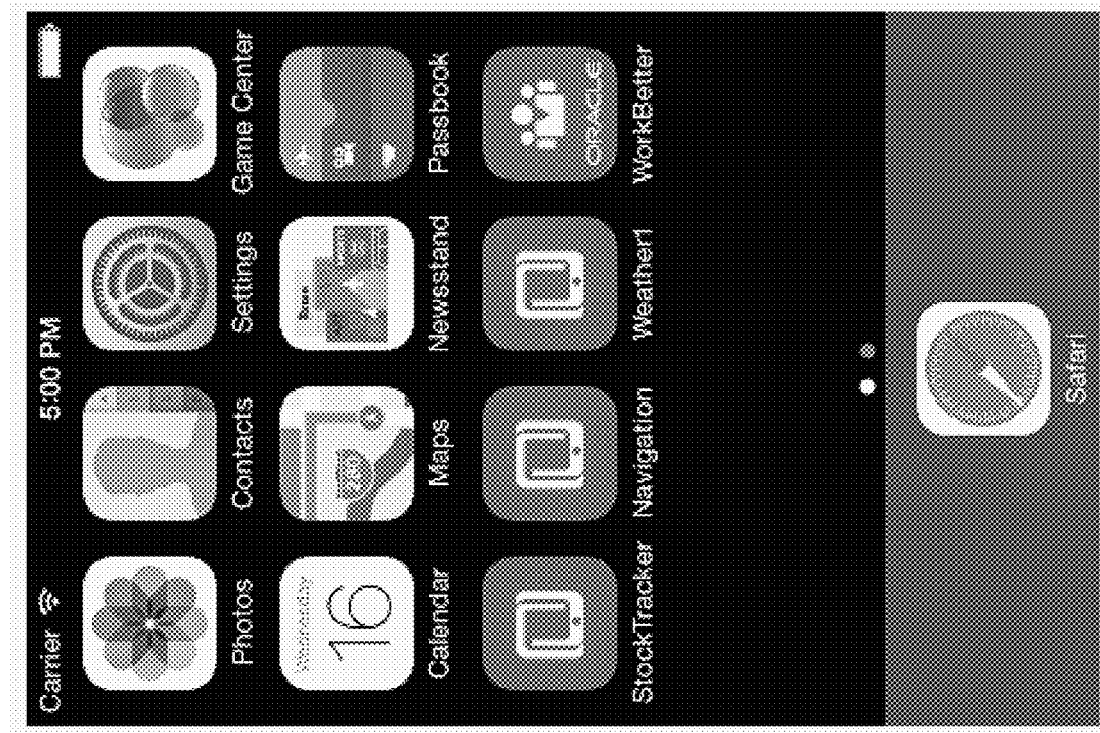
FIG. 7 illustrates a mobile application springboard in accordance with an embodiment of the present invention.

FIG. 7 illustrates an example mobile application springboard 700 that includes a MAF application 702 called "WorkBetter" that is deployed as a "heavy" application (e.g., a mobile application that sits in a mobile device in the same manner as a normal iPhone "app" obtained from the App store). A MAF application may include one or more embedded applications added as application features. Such added application features are represented as icons within the main application's springboard or navigation bar. Application features are essentially the building blocks of such mobile application. Each application feature that is integrated into a MAF application performs a specific set of tasks. Application features can be grouped together to complement each other's functionality. For example, an application feature that provides customer contacts may be paired with one for product inventory. Because each application feature has its own class loader and web view, application features are independent of one another, thus a single MAF application can be assembled from application features created by several different development teams. Application features can also be reused in other MAF applications. A MAF application itself can be reused as the base for another application, allowing independent software vendors ("ISVs") to create applications that can be configured by specific customers.

In addition to hybrid mobile applications that run locally on the device, application features may be implemented as any of the following mobile application types, depending on the requirements of a mobile application and available resources:

For mobile web applications hosted on a server, although the code can be portable between platforms, access to device features and local storage can be limited as these applications are governed by the device's browser.

Native applications are authored in either Xcode or through the Android SDK and are therefore limited in terms of serving both platforms. Reuse of code is likewise limited.

MAF supports authentication and access control for refined security at the feature level in an application where a developer can specify an appropriate login server, e.g., a server running "Oracle Identity Management" and/or "Oracle WebLogic" with basic authentication, a server supporting OAuth protocols, etc. At runtime users are presented with login screens and appropriate tokens are accessible for further Web service calls. With MAF, developers can build single UIs that meet the needs of users with different privileges (e.g., show/hide components based on user role or privilege).

MAF enforces communication encryption using SSL/TLS (HTTP secure ("HTTPS")), on-device encryption to keep credentials in an encrypted key store to be used for validation when supporting offline authentication, and SQLite database encryption by using the SQLite encryption extension. Encrypting a SQLite database for an application built with MAF may be performed via a configuration option when the application is developed. In some embodiments, MAF supports offline and online modes of operation for an application so a self-contained application can run on a mobile device in connected and disconnected modes. For data access/storage, such application may leverage a local encrypted SQLite database. The application may be built such that initial access to data is performed from remote servers through Web services, and the data is then stored in the local SQLite database for offline access. The data can be replicated and synchronized to the server when connectivity is available again. MAF also supports local storage of user authentication credentials to enable offline authentication/authorization to secured applications.

Figure 8:
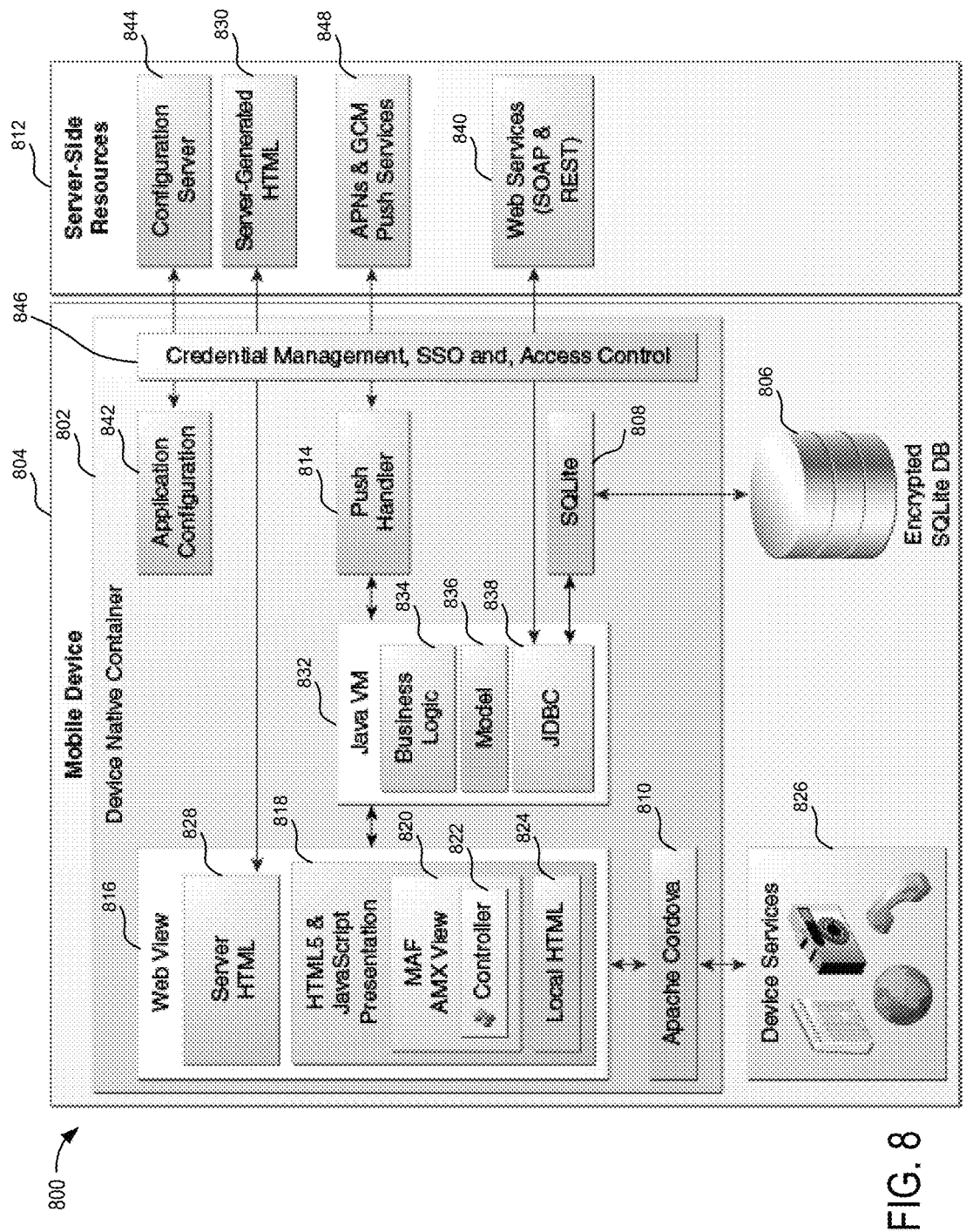
FIG. 8 is a block diagram of a mobile application framework runtime architecture in accordance with embodiments of the present invention.

FIG. 8 is a block diagram of a MAF runtime architecture 800 according to an embodiment. Runtime architecture 800 includes a "thin" device native container 802 deployed to a mobile device 804. Runtime architecture 800 represents the MVC development approach which separates the presentation from the model layer and the controller logic. Device native container 802 allows a MAF application to function as a native application on different platforms (e.g., iOS, Android, etc.) by interacting with a local SQLite database 806 (via SQLite 808), mobile device services 826 (via Cordova APIs of Apache Cordova 810), and server-side resources 812 such as a Configuration Server 844, Server-Generated HTML 830, Push Services 848, and Web Services 840.

Device Services 826 are services and features that are native to device 804 such as camera, GPS, e-mail, etc. Configuration Server 844 is a server based on Web Distributed Authoring and Versioning ("WebDav") and hosting configuration files used by the application configuration services. WebDav is defined in, e.g., Internet Engineering Task Force ("IETF") Request for Comments ("RFC") 4918. Configuration Server 844 is delivered as a reference implementation. Any common WebDav services hosted on a Java 2 Platform, Enterprise Edition ("J2EE") server can be used for this purpose. Server-Generated HTML 830 includes Web content hosted on remote servers and used for browser-based application features. Push Services 848 may include, for example, Apple Push Notification Services ("APNs") and Google Cloud Messaging ("GCM") push services that are notification providers that send notification events to MAF applications. Web Services 840 are, for example, remotely hosted SOAP-based web services.

Device native container 802 includes Web View 816 that uses a mobile device's web engine to display and process web-based content. In a MAF application, Web View 816 delivers the UI by rendering the application markup as HTML 5. The UI may be created for a mobile application feature by implementing any of the following content types: MAF Application Mobile XML ("AMX") Views 820, Controller 822, local HTML 824, or server HTML 828, where MAF AMX Views 820, Controller 822, and local HTML 824 provide HTML5 and JavaScript presentation 818. Application features implemented from various content types can coexist within the same mobile application and can also interact with one another.

Applications whose contents are implemented as MAF AMX views 820 reside on device 804 and provide the most authentic device-native user experience, similar to an application authored in the language specific to the device's platform. MAF provides a set of code editors that enable a user to declaratively create a UI from components that are tailored to the form factors of mobile devices. These components can be used to create the page layout (e.g., list view) as well as input components (e.g., input fields). When a user develops MAF AMX views 820, they can leverage data controls which enable the user to declaratively create databound UI components and access a Web service and the services of a mobile device (e.g., camera, GPS, or e-mail). At runtime, a JavaScript engine in Web View 816 renders MAF AMX view definitions into HTML5 and JavaScript.

For applications whose contents are implemented as Controller 822, Controller 822 governs the flow between pages in the mobile application. Controller 822 enables a user to break an application's flow into smaller reusable task flows and include non-visual components such as method calls and decision points. In the embodiment of FIG. 8, Controller 822 is included in MAF AMX Views 820 and is called by MAF AMX Views 820 to, e.g., transition a page and/or activate actions. However, in alternative embodiments, Controller 822 may be implemented as a peer of MAF AMX Views 820.

For applications whose contents are implemented as local HTML 824, HTML pages run on the device as part of the MAF application. Local HTML files can access device-native features and services through Apache Cordova 810 and JavaScript APIs.

For applications whose contents are implemented as server HTML 828, the UI is delivered from server-generated Web pages (Server-Generated HTML 830) that can open within the application feature's Web View 816. Within the context of MAF, this content type is referred to as remote URL. The resources for these browser-based applications do not reside on device 804. Instead, the UI, page flow logic, and business logic are delivered from a remote server.

When one of these remotely hosted Web applications is allowed to open within Web View 816, it can use Cordova JavaScript APIs to access any designated device-native feature or service such as the camera or GPS capabilities. When implementing an application using the remote URL content, a user can leverage an existing browser-based application that has been optimized for mobile use, or use one that has been written specifically for a specific type of mobile device. For applications that can run within the browsers on either desktops or tablets, the user can implement the remote URL content using applications created through rich client-based components such as those provided by "Oracle ADF Faces" from Oracle Corp. For applications specifically targeted to mobile phones, the remote URL content can be delivered from Web pages created using MAF. Not only can applications authored with MAF render on a variety of smartphones, but they can gracefully degrade to the reduced capabilities available on feature phones through UIs constructed with Apache Trinidad JSF components and dynamically selected style sheets. Because the content is served remotely, the application is available only as long as the server connection remains active.

Device native container 802 further includes Apache Cordova 810 that provides JavaScript APIs that integrate the device's native features and services into a mobile application. Although a user can access these APIs programmatically from Java code (or using JavaScript when implementing a MAF mobile application as local HTML 824), the user can add device integration declaratively when creating MAF AMX pages because MAF packages these APIs as data controls.

Device native container 802 further includes a Java Virtual Machine ("JVM") 832. Java provides a Java runtime environment for a MAF application. JVM 832 is implemented in device-native code, and is embedded (or compiled) into each instance of the MAF application as part of the native application binary. JVM 832 is based on the Java Platform, Micro Edition ("Java ME") Connected Device Configuration ("CDC") specification. In runtime architecture 800, JVM 832 includes business logic 834, model 836, and Java database connectivity ("JDBC") 838. Java enables business logic 834 in MAF applications. Managed Beans ("MBeans") are Java classes that can be created to extend the capabilities of MAF, such as providing additional business logic for processing data returned from the server. MBeans are executed by the embedded Java support, and conform to the Java ME CDC specifications. Model 836 includes the binding layer that connects the business logic components with the UI. In addition, the binding layer provides the execution logic to invoke web services 840 such as remotely hosted SOAP-based web services. These services are accessed through the Java layer (JVM 832). Application features authored in MAF AMX access SOAP-based data services through data controls. JDBC 838 is an API that enables the model layer to access the data in encrypted SQLite database 806 through Create, Read, Update, and Delete ("CRUD") operations.

Device native container 802 further includes Application Configuration 842 which refers to services that allow application configurations to be downloaded and refreshed, such as URL endpoints for a web service or a remote URL connection of a configuration server 844. Application configuration services download the configuration information from a server-side WebDav-based service.

Device native container 802 further includes module 846 that provides Credential Management, Single Sign-on ("SSO"), and Access Control. MAF handles user authentication and credential management through the "Oracle Access Management Mobile and Social" ("OAMMS") identity manager ("IDM") SDKs. MAF applications perform offline authentication, meaning that when users log in to the application while connected, MAF maintains the username and password locally on device 804, allowing users to continue access to the application even if the connection to the authentication server becomes unavailable. MAF encrypts the locally stored user information as well as the data stored in local SQLite database 806. After authenticating against the login server, a user can access all of the application features secured by that connection. MAF also supports the concept of access control by restricting access to application features (or specific functions of application features) by applying user roles and privileges. For remotely served Web content, MAF uses whitelists to ensure that only the intended URIs can open within the application feature's web view 816 (and access the device features).

Device native container 802 also enables push notifications via a Push Handler 814 that communicates with push services 848 included in server side resources 812 and enables MAF applications to receive events from notification servers such as the iOS or Android notification servers. The Java layer (JVM 832) handles the notification processing.

In runtime architecture 800, device native container 802 interacts with encrypted SQLite Database 806 that is an embedded SQLite database that protects locally stored data and is called by the model layer using JDBC 838. The MAF application generates this lightweight, cross-platform relational database 806. Because database 806 is encrypted, it secures data if the device is lost or stolen. Only users who enter the correct user name and password can access the data in this database.

Thread Synchronization for Platform Neutrality

As disclosed herein, MAF is a framework that can be used to build enterprise business applications for mobile devices with different operating systems such as iOS, Android, Windows 10, etc. MAF provides platform neutral application development functionality for end users. In order to achieve platform neutrality, MAF implements various programming languages at various layers in a single process. In one embodiment, each programming environment has its own mechanism of threading. However, communication with other programming environments requires a mechanism that is not specific to the language of that environment. Further, MAF applications need to support atomic operations even when they operate across various layers/environments. In one embodiment, MAF embeds a JVM inside the application and has native code that accesses Java using a VMChannel as described herein.

Figure 9:
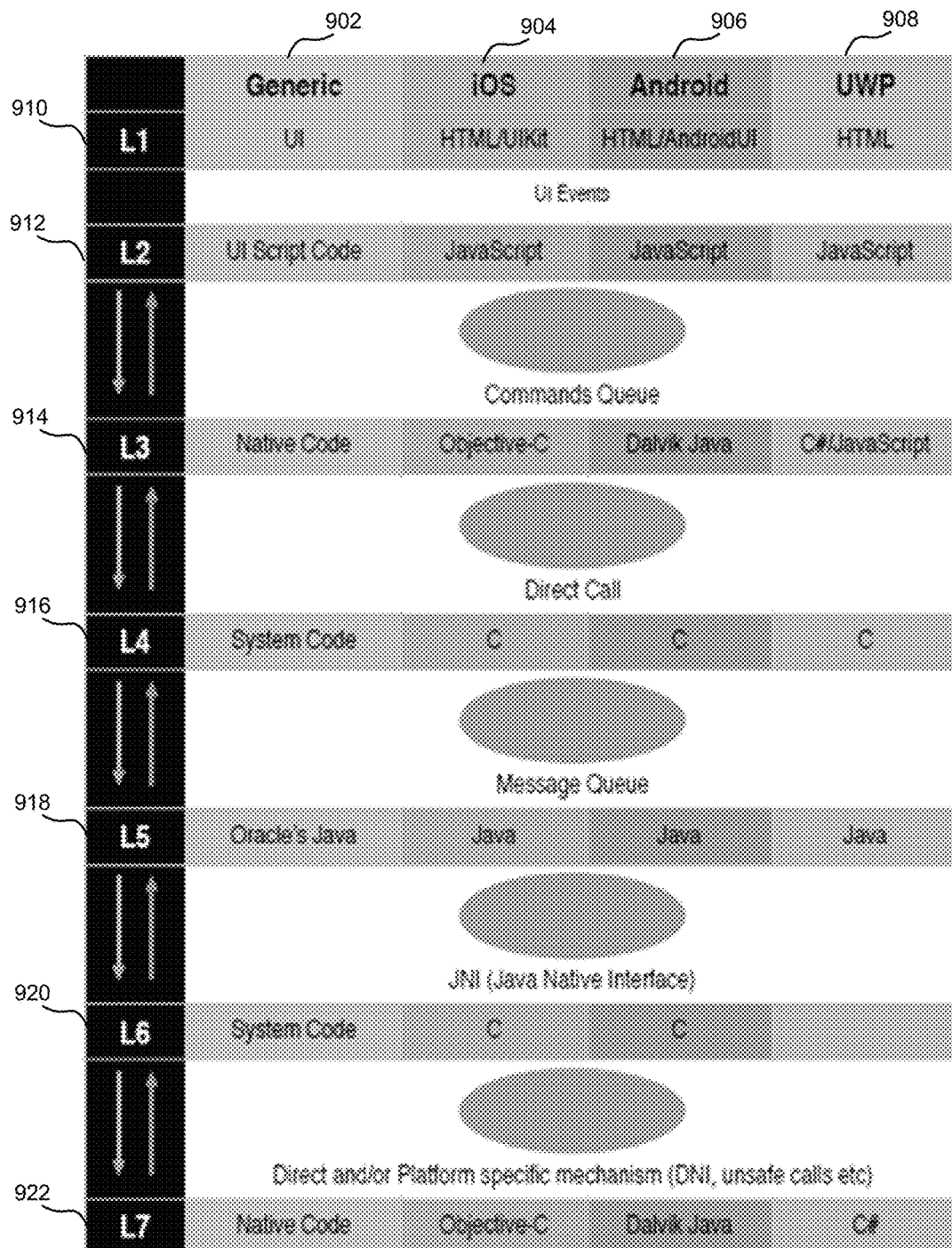
FIG. 9 illustrates example interactions and control flow across various layers of operation of an application, according to some embodiments.

FIG. 9 illustrates an example of interactions and the overall control flow across various layers of operation of an application in various platforms, according to some embodiments. More specifically, FIG. 9 illustrates example interactions and control flow across various layers in a generic platform 902, as well as in specific platforms such as iOS 904, Android 906, and Universal Windows Platform ("UWP") 908.

In FIG. 9, seven successive layers of functionality are indicated in each platform. These seven layers include layer 1 or UI layer 910, layer 2 or UI script code layer 912, layer 3 or native code layer 914, layer 4 or system code layer 916, layer 5 or Oracle's Java layer 918, layer 6 which is another system code layer 920, and layer 7 which is another native code layer 922. Layer 1 or UI layer 910 provides the UI of an application. In one embodiment, UI layer 910 may be implemented in HTML. Layer 2 or UI script code layer 912 implements the UI script code associated with UI events of the UI. In one embodiment, UI script code at layer 2 may be implemented in JavaScript.

Layer 3 or native code layer 914 links the script code of the UI with business logic of the application through system calls. In one embodiment, depending on the platform, a MAF application may implement native code in Objective-C, Android Java (Dalvik Java), or WinJS+C# code at layer 3. In one embodiment, the combination of layer 2 and layer 3 is implemented by Cordova.

Layer 4 or system code layer 916 includes C code that implements the system calls to business logic of the application. Business logic of the application is implemented at layer 5 or Oracle's Java layer 918. This layer is implemented in Java (Oracle's Standard Java) in all platforms. That is, irrespective of the platform, business logic in implemented by a JVM at layer 5. Any system layer calls required by layer 5 are handled by layer 6 which is implemented in C code and is common for all platforms. Layer 7 corresponds to the operating system of the device and is platform dependent. For example, depending on the device platform, layer 7 may be implemented in Objective-C, Android Java (Dalvik Java), or WinJS+C# code.

In one embodiment, when a request starts at the top layer UI, the request-response cycle has to go through all these layers, and each layer may have its own synchronization mechanism. In one example, the interactions across various layers are as follows. Layer 2 is triggered by UI events at layer 1. Layer 2 and layer 3 interact via a commands queue. Layer 3 and layer 4 interact via direct calls (e.g., direct function calls). Layer 4 and layer 5 interact via a message queue.

Layer 5 and layer 6 interact via a Java Native Interface ("JNI") to implement a programming interface that enables Java code to interact with a JVM so that the Java code can call or be called by native applications or libraries in a different programming language (e.g., C). Layer 6 and layer 7 interact via direct and/or platform specific mechanisms. Layer 6 may be implemented in JNI with a generic C programming interface that is compiled into a platform specific executable, and the C code makes calls to platform specific APIs in layer 7 to perform actions. For Android platforms, layer 6 (implemented with a generic JNI) and layer 7 may interact via Dalvik Native Interface ("DNI"). For iOS platforms, layer 6 is implemented with JNI code in C and invokes layer 7, and layer 7 is an iOS system library that can be implemented in Objective-C.

In FIG. 9, even though layer 6 and layer 7 appear to be similar to layer 4 and layer 3, respectively, they perform different actions. For example, their respective method calling semantics may vary based on which direction the execution of a function happens between layers 6 and 7 and between layers 3 and 4. For example, in Android platforms, layer 3 is implemented in Dalvik Java and calls layer 4 system APIs implemented in C, and Java native methods are used in these calls. However, this functionality is reversed between layer 6 and layer 7 where the C code is invoking Java methods going through different method calling semantics. For iOS platforms, Objective-C in layer 3 calls layer 4 system APIs implemented in C, while C in layer 6 calls Objective-C in layer 7.

Atomicity Across Various Layers in a Single Process

In computer science, synchronization may refer to synchronization of processes or synchronization of data. In process synchronization, multiple processes join up or handshake at a certain point to reach an agreement or commit to a certain sequence of action. Data synchronization keeps multiple copies of a dataset in coherence with one another or maintains data integrity.

Some known systems implement a client server model where a client application tries to get some data from a server. The server may be a single server or a multi-tier server with various layers of data aggregation. For example, such system may include a J2EE server which talks to a database server to gather data, and further talks to an authentication server to authorize the client, and so on. As such, these known systems may perform synchronization across the communications of the server with multiple entities, and the details of the server communications are made transparent to the client application. For example, the server communications may happen upon a click of a button at the client application, and the user will then see the result. While these known systems perform synchronization, such synchronization is across multiple machines/processes, not within a single machine/process.

Further, some known systems that implement Cordova based functionality may provide synchronization across two layers: a native environment (e.g., iOS, Android, etc.), and JavaScript. This synchronization is typically performed by a WebView like UI control that uses a queuing mechanism to process requests. However, these known systems do not provide synchronization functionality for programmatic threads, such as those that result from the communication between a native code and a code run in a virtual machine with a different programming language. With reference to the embodiment of FIG. 9, Cordova functionality in these known systems is similar to the functionality in layers 1, 2, and 3. However, the embodiment of FIG. 9 includes several more tiers/layers, including Oracle's Java code layer.

In contrast to the known systems, embodiments of the present invention provide platform neutral application functionality by achieving atomicity across various layers of various programming languages in a single process. One embodiment implements synchronization functionality so that an application developer can "build once and deploy anywhere." In one embodiment, with reference to FIG. 9, a developer may develop an application that has a very thin layer at the top for each platform to implement layers 1-3, has the functionality of layers 4-7 in common among all platforms, and has a JVM at layer 4 being implemented within a device native container (see FIG. 8).

In one embodiment, MAF may be considered a client server system, with layer 1 being the client and layer 5 being the server in the sense of serving some functionality. However, in MAF architecture, there are various layers in the control flow and many of the layers are in different programming environments (e.g., Objective-C, Java, JavaScript, C, etc.). The control flow across these layers has to work atomically until the result is passed back to the initiating layer (i.e., layer 1). For synchronization purposes, MAF uses the supported synchronization mechanisms of each layer's programming environment.

For example, a layer implemented in the C language may use C language constructs to do synchronization, while a Java layer may use Java's synchronized methods. For HTML that implements the UI layer, all UI element interactions are synchronized unless an event code is multi-threaded. Event listeners to the UI elements in HTML may be implemented in JavaScript, in which case their synchronization functionality depends on how the JavaScript code is implemented. In iOS platforms, UIKit is the iOS-specific UI layer, and the corresponding event listeners are in Objective-C. Therefore, synchronization of the UI layer in iOS depends on how Objective-C performs synchronization. In Android platforms, AndroidUI is the Android specific UI layer, and the corresponding event listeners are in Dalvik Java. Therefore, synchronization of the UI layer in Android depends on how Java performs synchronization.

JNI provides a notation on how C methods need to be named for Java to call them, and implements synchronization functionality of C. In Java, synchronization is performed by using Java keyword "synchronized." In Objective-C, synchronization is performed using the directive "@synchronized." In C#, synchronization is performed using the "lock" keyword. In C, synchronization is performed using the POSIX thread API. On Android platforms, code is in Java and C, and Java and C language constructs are implemented for synchronization.

When a request is invoked at UI layer 910, the thread that needs to process this request in combination with various threads at various layers work together to get the end result. In one embodiment, threads in different layers that are in different programming environment such as iOS ObjectiveC, Android Dalvik Java, JavaScript, Cordova, C, WinJS, C#, Java, and JNI are synchronized to perform a request/response cycle.

Figure 10:
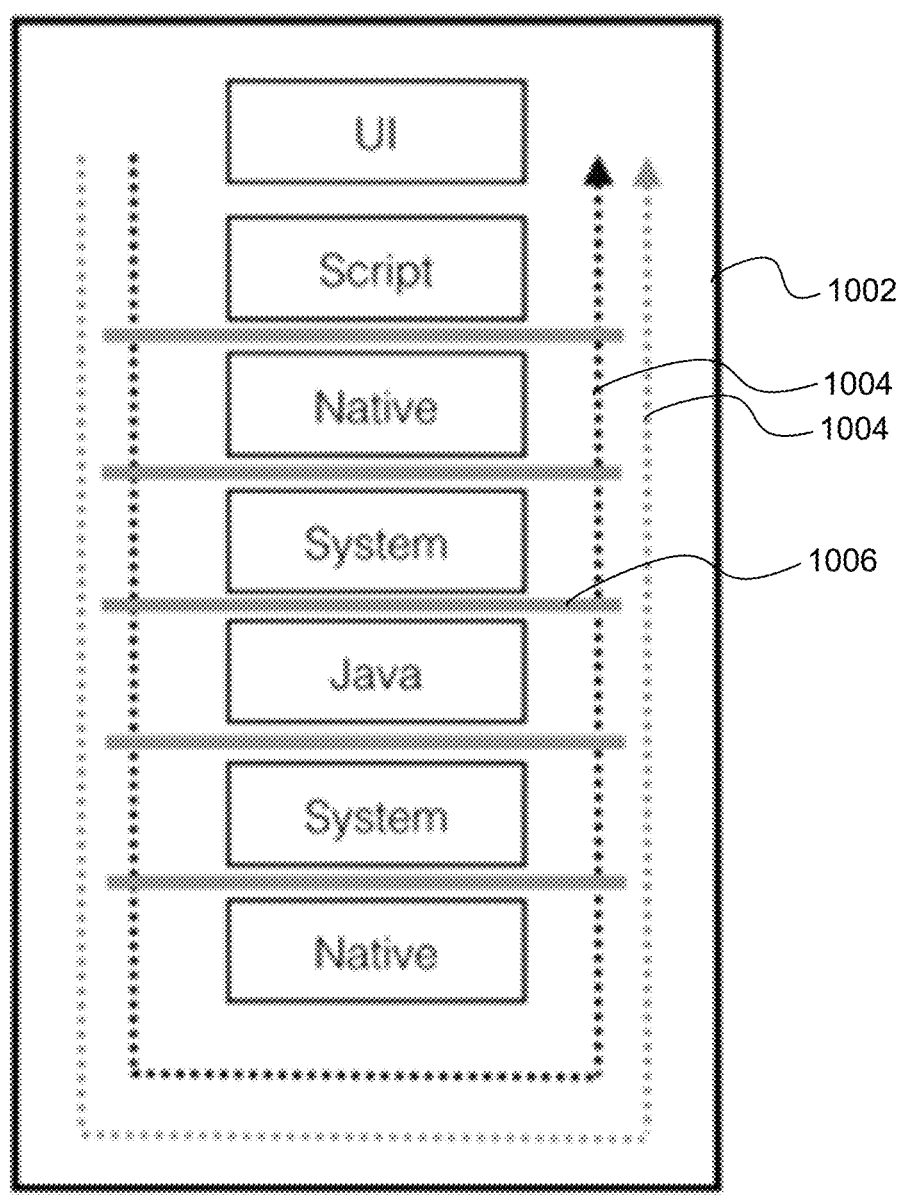
FIG. 10 illustrates an example atomic operation across multiple layers of multiple programming environments in a single process of a mobile application, according to an embodiment.

FIG. 10 illustrates an example atomic operation 1004 across multiple layers of multiple programming environments in a single process 1002 of a MAF mobile application according to an embodiment. In one embodiment, there may be several of these atomic operations, and each of them will have its own context (e.g., its own state of data, e.g., data structures, variables, fields, mutexes, locks, etc.). For example, two different button clicks from a UI may trigger the same code flow, but each respective thread will have its own data. While some static/global data may be shared by any code that is being executed in an application, in a multi-threaded environment, it is typical to have local data per thread, and such state is generally referred to as context.

For each atomic operation, individual threads at each layer are synchronized to complete the flow in an atomic fashion. For the UI layer, UI elements have event listeners and are by-default synchronized, and threads can be spawned within EventListener methods. The rest of the execution is synchronized using respective language supported synchronization mechanisms. In FIG. 10, the synchronization is implemented by "wait and notify" functionality 1006 for the communication between every two successive layers beginning from the UI script code layer. Accordingly, each message implements a blocking request until a corresponding response is received. That is, each layer contributes in the atomicity by implementing a blocking mechanism to complete the processing of a message/command before sending a subsequent message/command.

For example, in one embodiment with reference to FIG. 9, when layer 2 places a command in the commands queue between layers 2 and 3, it waits for a corresponding response before placing a subsequent command in the commands queue. Accordingly, implementing wait and notify functionality causes the commands queue to provide synchronous communication of commands. Similarly, when layer 4 places a message in the message queue between layers 4 and 5, it waits for a corresponding response before placing a subsequent message in the message queue. Accordingly, implementing wait and notify functionality causes the message queue to provide synchronous communication of messages.

In one embodiment, the blocking is performed via a channel such as the VMChannel described herein. For example, in one embodiment, a JavaScript call of layer 2 is placed in a queue (i.e., implementing the commands queue between layer 2 and layer 3) and is then pulled off in layer 3 which can be implemented by Cordova. Subsequently, layer 4 makes a call out to a VMChannel which is a logical queue (i.e., implementing the message queue between layer 4 and layer 5) and the message is queued in the VMChannel. The message may indicate, for example, Java functionality such as class, methods, and parameters. Layer 5 then pulls off the message from the VMChannel and calls a thread that invokes the corresponding method related to certain business logic. In one embodiment, wait and notify functionality is implemented within the VMChannel.

Once the action of the method is performed, a response comes back and is matched up to the invoking queue (i.e., a respective VMChannel) and walks its way back up to the JavaScript layer (i.e., layer 2). Accordingly, the embodiment implements a series of asynchronous calls between layer 2 and layer 5, and the asynchronous calls are serialized to appear as a single call. Such synchronization is achieved by coordinating multiple queues in tandem, and the queues maintain order and synchronization so that only one thread is processed at any given time. Therefore, atomic operation is achieved across a single process in various layers and various programming environments.

For example, with reference to the embodiment of FIG. 9, when a user taps on a button in a MAF mobile application to get data stored on a server, layer 1 or UI layer 910 corresponds to the user tapping the button on a UI of a mobile device. This triggers an event to execute an associated script method in layer 2 or UI script code layer 912. The script puts a command in a queue (e.g., the commands queue in FIG. 9) and waits for a corresponding response from layer 3 or native code layer 914. A monitor thread that is running in native code layer 914 reads this command, converts it into a message to send to lower layer business logic using system code in layer 4 or system code layer 916, and waits for a corresponding response to arrive. Layer 4 makes a system call to put this message in a queue (e.g., the message queue in FIG. 9) and waits for a corresponding response to arrive. This message is read by the business logic layer (i.e., layer 5 or Java code layer 918). Based on what the message is, layer 5 may make calls to system APIs at layer 6 or system code layer 920, and layer 6 may reach the operating system at layer 7 or native code layer 922 when executing such system APIs.

The following functionalities provides an example of implementing wait and notify functionality in various layers in UWP.

```
// Layer-2 JavaScript
/////////////////////////////////////////////////
function buttonClick( ) {
    new UWPClass( ).someMethod(someData);
}
// Layer-3 C#
/////////////////////////////////////////////////
public class UWPClass
{
    Object myLock = new Object( );
    public void someMethod(MyObject anObject)
    {
        lock(myLock)
        {
            cMethod(anObject.id, anObject.number);
        }
    }
    [DllImport("mydll", CallingConvention = CallingConvention.Cdecl,
    ExactSpelling=true)]
    public static extern void cMethod(int id, int number);
}
// Layer-4 C/C++
/////////////////////////////////////////////////
HANDLE myMutex = CreateMutexExW(NULL, m_buff, 0,
SYNCHRONIZE);
void cMethod(int id, int number) {
    WaitForSingleObjectEx(myMmutex, INFINITE,FALSE);
    // ... some logic goes here
    // Shared memory read/write
    readFromLowLevelSharedMemory( );
    ReleaseMutex(myMutex);
}
/// Layer-5 Java
/////////////////////////////////////////////////
package com.oracle.sample;
public class JavaClass {
    public void sendData(int data) {
        writeToSharedMemory(data);
    }
    public void native writeToSharedMemory(int data);
};
/// Layer-6 JNI C/C++
/////////////////////////////////////////////////
JNIEXPORT void JNICALL
Java_com_oracle_sample_JavaClass_writeToSharedMemory
(JNIEnv *env, jclass clazz, jint data) {
    WaitForSingleObjectEx(myMmutex, INFINITE,FALSE);
    // ... some logic goes here
    // Shared memory write
    writeToLowLevelSharedMemory( );
    // Some platform API Call
    ReadDeviceStauts( );
    ReleaseMutex(myMutex);
}
// Layer-7 C#
/////////////////////////////////////////////////
public class UWPHelperClass {
    [DllExport("ReadDeviceStauts", CallingConvention =
    CallingConvention.StdCall)]
    public static void ReadDeviceStauts( )
    {
        // Platform API to read DeviceStatus
    }
};
```

The following functionalities provides an example of implementing wait and notify functionality in various layers in iOS.

```
// Layer-2 JavaScript
/////////////////////////////////////////////////
function buttonClick( ) {
    // Uses Cordova to invoke native method
    // Something like invoke UIWebView navigateTo
    ("maf://somcustomurl")
    // The Listener of the WebView will handle this event
}
// Layer-3 Objective-C
/////////////////////////////////////////////////
@interface IOSUIWebViewListenerClass : NSObject
–(void) someMethod: (NSObject*) anObject;
@end
@implementation IOSUIWebViewListenerClass
–(void) someMethod: (NSObject*) anObject)
{
    public void someMethod(MyObject anObject)
    {
        @synchronized(myLock)
        {
            cMethod(anObject.id, anObject.number);
        }
    }
}
@end
// Layer-4 C/C++
/////////////////////////////////////////////////
pthread_mutex_t *myMutex;
pthread_cond_t *myCond;
HANDLE myMutex = CreateMutexExW(NULL, m_buff, 0,
SYNCHRONIZE);
void cMethod(int id, int number) {
    pthread_mutex_lock(myMutex);
    // ... some logic goes here
    // Shared memory read/write
    readFromLowLevelSharedMemory( );
    pthread_cond_signal(myCond);
    pthread_mutex_unlock(myMutex);
}
// Layer-5 Java
/////////////////////////////////////////////////
package com.oracle.sample;
public class JavaClass {
    public void sendData(int data) {
        writeToSharedMemory(data);
    }
    public void native writeToSharedMemory(int data);
};
// Layer-6 JNI C/C++
/////////////////////////////////////////////////
JNIEXPORT void JNICALL
Java_com_oracle_sample_JavaClass_writeToSharedMemory
(JNIEnv *env, jclass clazz, jint data) {
    pthread_mutex_lock(myMutex);
    // ... some logic goes here
    // Shared memory write
    writeToLowLevelSharedMemory( );
    // Some platform API Call
    [IOSHelperClass readDeviceStatus];
    pthread_cond_signal(myCond);
    pthread_mutex_unlock(myMutex);
}
// Layer-7 Objective-C
/////////////////////////////////////////////////
@interface IOSHelperClass : NSObject
+(void) readDeviceStatus;
@end
@implementation IOSHelperClass
+(void) readDeviceStauts
{
    // Platform API to read DeviceStatus
}
@end
```

The following functionalities provides an example of implementing wait and notify functionality in various layers in Android.

```
// Layer-2 JavaScript
//////////////////////////////////////////////
function buttonClick( ) {
    // Uses Cordova to invoke native method
    // Something like invoke UIWebView navigateTo
    ("maf://somcustomurl")
    // The Listener of the WebView will handle this event
}
// Layer-3 Dalvik Java
//////////////////////////////////////////////
public class AndroidUIWebViewListenerClass {
    public void someMethod(Object anObject) {
        synchronized(myLock) {
            cMethod(anObject.id, anObject.number);
        }
    }
    public static native void cMethod(int id, int number);
}
@end
// Layer-4 C/C++ (Android Dalvik Native Interface)
//////////////////////////////////////////////
pthread_mutex_t *myMutex;
pthread_cond_t *myCond;
HANDLE myMutex = CreateMutexExW(NULL, m_buff, 0,
SYNCHRONIZE);
JNIEXPORT void JNICALL
Java_com_oracle_sample_JavaClass_cMethod
(JNIEnv *env, jclass clazz, jint id, jint number) {
    pthread_mutex_lock(myMutex);
    // ... some logic goes here
    // Shared memory read/write
    readFromLowLevelSharedMemory( );
    pthread_cond_signal(myCond);
    pthread_mutex_unlock(myMutex);
}
// Layer-5 Java
//////////////////////////////////////////////
package com.oracle.sample;
public class JavaClass {
    public void sendData(int data) {
        writeToSharedMemory(data);
    }
    public void native writeToSharedMemory(int data);
};
// Layer-6 JNI C/C++
//////////////////////////////////////////////
JNIEXPORT void JNICALL
Java_com_oracle_sample_JavaClass_writeToSharedMemory
(JNIEnv *env, jclass clazz, jint data) {
    pthread_mutex_lock(myMutex);
    // ... some logic goes here
    // Shared memory write
    writeToLowLevelSharedMemory( );
    // Some platform API Call
    readDeviceStatus( )
    pthread_cond_signal(myCond);
    pthread_mutex_unlock(myMutex);
}
static JavaVM *jvm = ... // Initialize JVM
int readDeviceStatus( ) {
    jclass cls = (*env)->FindClass( env,
    "com/oracle/sample/AndroidHelperClass");
    jmethodID mid = (*env)->GetMethodID(env, cls,
    "readDeviceStauts", "( )V");
    JNIEnv *env;
    (*jvm)->AttachCurrentThread(jvm, (void **)&env, NULL);
    (*env)->CallVoidMethod(env, cls, mid);
}
// Layer-7 Android Java
//////////////////////////////////////////////
public class AndroidHelperClass {
    public static synchronized void readDeviceStauts( ) {
        // Platform API to read DeviceStatus
    }
}
```

Figure 11:
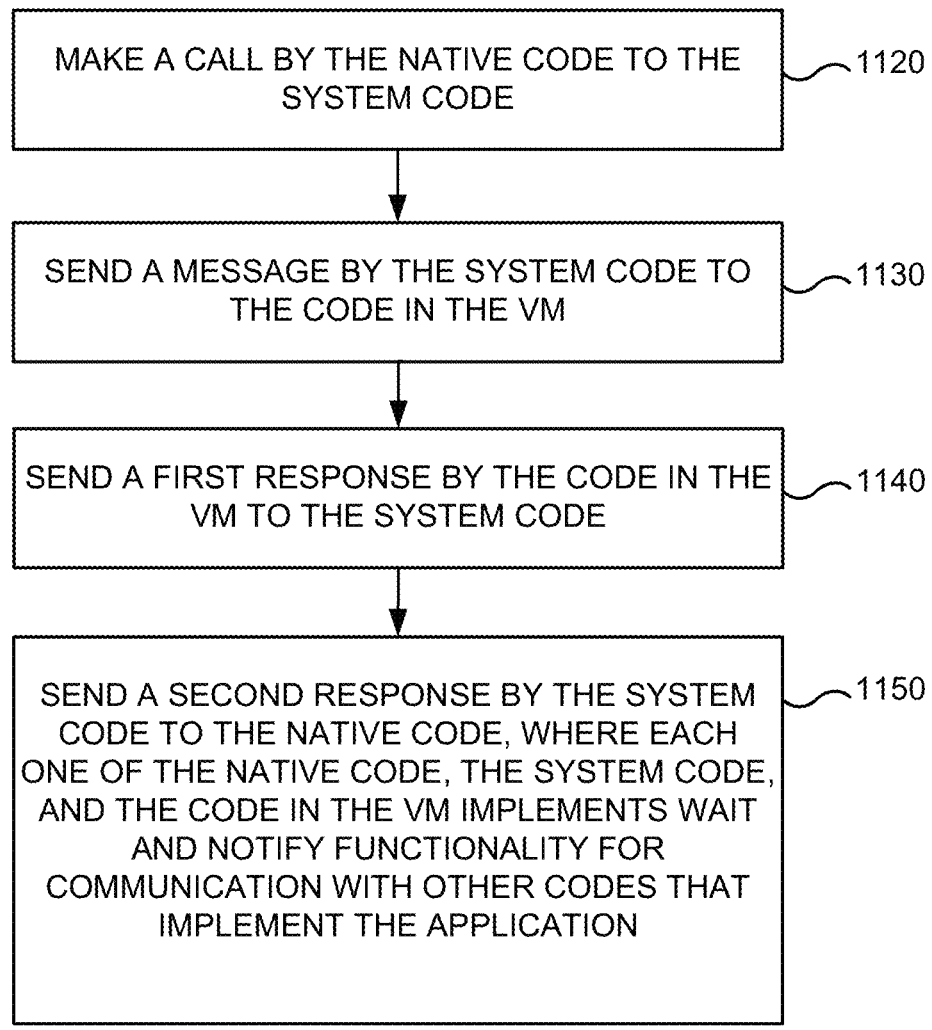
FIG. 11 is a flow diagram of functionality for thread synchronization in accordance with embodiments of the present invention.

FIG. 11 is a flow diagram of functionality for thread synchronization in accordance with embodiments of the present invention that perform thread synchronization across layers of code that implement an application, including native code, system code, and code in a VM.

At 1120 the native code makes a call to the system code. In one embodiment, the native code initiates the call based on a command received from UI script code of the application. In one embodiment, the UI script code implements wait and notify functionality for communication with other codes that implement the application. In one embodiment, the UI script code initiates the command based on a UI event detected at a UI of the application. In one embodiment, the UI script code and the native code communicate via a commands queue that implements wait and notify functionality.

At 1130 the system code sends a message to the code in the VM. In one embodiment, the system code and the code in the VM communicate via a message queue that implements wait and notify functionality. In one embodiment, the code in the VM implements a business logic of the application. In one embodiment, the code in the VM invokes a method related to the message, and the method implements a business logic of the application At 1140 the code in the VM sends a first response to the system code, and at 1150 the system code sends a second response to the native code. In one embodiment, each one of the native code, the system code, and the code in the VM implements wait and notify functionality for communication with other codes that implement the application. In one embodiment, the wait and notify functionality provides atomic operation across the layers of code that implement the application.

In one embodiment, the UI script code is implemented in a first programming language, the native code is implemented in a second programming language, the system code is implemented in a third programming language, and the code in the VM is implemented in a fourth programming language. In one embodiment, the UI script code is implemented in JavaScript, the system code is implemented in C, and the code in the VM is implemented in Java. In one embodiment, the UI script code and the native code are implemented in respective programming languages that depend on a platform of a device that is running the application.

As disclosed, embodiments provide "build once and deploy anywhere" application development functionality to provide applications that work the same on various platforms. One embodiment provides a metadata infrastructure in MAF and runs business logic in a single common language (i.e., Java). One embodiment further provides thread synchronization to preserve the ordering of the events to assure that the functionality of an application will be exactly the same in different platforms. One embodiment achieves such synchronization by using specific blocking mechanisms of respective programming languages at each layer. Accordingly, by achieving synchronization of various layers with various programming languages in a single process, a developer may write a single business application that works the same in different platforms such as iOS, Android, Windows, etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform thread synchronization across layers of code that implement an application, including native code, system code, and code in a virtual machine (VM), the processor:

> making a call by the native code to the system code, wherein the native code initiates the call based on a command received from a user interface (UI) script code of the application;
> sending a message by the system code to the code in the VM;
> sending a first response by the code in the VM to the system code; and
> sending a second response by the system code to the native code;
> wherein the application is implemented in a single process based on code synchronization among at least the native code, the system code, and the code in the VM, wherein each one of the native code, the UI script code, the system code, and the code in the VM perform wait and notify functionality for communication with other layers of code that implement the application, wherein the UI script code and the native code communicate via a commands queue.

2. The computer readable medium of claim 1, wherein the wait and notify functionality provides atomic operation across the layers of code that implement the application.

3. The computer readable medium of claim 1, wherein the UI script code initiates the command based on a UI event detected at a UI of the application.

4. The computer readable medium of claim 1, wherein the system code and the code in the VM communicate via a message queue that implements wait and notify functionality.

5. The computer readable medium of claim 1, wherein the code in the VM implements a business logic of the application.

6. The computer readable medium of claim 1, wherein the UI script code is implemented in a first programming language, the native code is implemented in a second programming language, the system code is implemented in a third programming language, and the code in the VM is implemented in a fourth programming language.

7. The computer readable medium of claim 1, wherein the UI script code is implemented in JavaScript, the system code is implemented in C, and the code in the VM is implemented in Java.

8. The computer readable medium of claim 1, wherein the UI script code and the native code are implemented in respective programming languages that depend on a platform of a device that is running the application.

9. The computer readable medium of claim 1, wherein the code in the VM invokes a method related to the message, wherein the method implements a business logic of the application.

10. A method of thread synchronization across layers of code that implement an application, including native code, system code, and code in a virtual machine (VM), the method comprising:

> making a call by the native code to the system code, wherein the native code initiates the call based on a command received from a user interface (UI) script code of the application;
> sending a message by the system code to the code in the VM;
> sending a first response by the code in the VM to the system code; and
> sending a second response by the system code to the native code;
> wherein the application is implemented in a single process based on code synchronization among at least the native code, the UI script code, the system code, and the code in the VM, wherein each one of the native code, the system code, and the code in the VM perform wait and notify functionality for communication with other layers of code that implement the application, wherein the UI script code and the native code communicate via a commands queue.

11. The method of claim 10, wherein the wait and notify functionality provides atomic operation across the layers of code that implement the application.

12. The method of claim 10, wherein the UI script code initiates the command based on a UI event detected at a UI of the application.

13. A system for thread synchronization across layers of code that implement an application, including native code, system code, and code in a virtual machine (VM), the system comprising:

> a processor; and
> a memory coupled with the processor, wherein, when executing instructions stored on the memory, the processor:
>> makes a call by the native code to the system code, wherein the native code initiates the call based on a command received from a user interface (UI) script code of the application;
>> sends a message by the system code to the code in the VM;
>> sends a first response by the code in the VM to the system code; and
>> sends a second response by the system code to the native code;
>> wherein the application is implemented in a single process based on code synchronization among the native code, the system code, and the code in the VM, wherein each one of the native code, the UI script code, the system code, and the code in the VM perform wait and notify functionality for communication with other layers of code that implement the application, wherein the system code and the code in the VM communicate via a message queue.

14. The system of claim 13, wherein the wait and notify functionality provides atomic operation across the layers of code that implement the application.

15. The system of claim 13, wherein the UI script code initiates the command based on a UI event detected at a UI of the application.

* * * * *

UNITED STATES PATENT AND TRADEMARK OFFICE
CERTIFICATE OF CORRECTION

PATENT NO. : 10,198,279 B2
APPLICATION NO. : 15/229404
DATED : February 5, 2019
INVENTOR(S) : Nelaturu et al.

Page 1 of 1

It is certified that error appears in the above-identified patent and that said Letters Patent is hereby corrected as shown below:

In the Specification

Column 16, Line 40, delete "receiver" and insert -- receiver. --, therefor.

Column 30, Line 22, delete "application" and insert -- application. --, therefor.

Signed and Sealed this
Twenty-eighth Day of January, 2020

Andrei Iancu
*Director of the United States Patent and Trademark Office*